US011213779B2

(12) United States Patent
Hoerr et al.

(10) Patent No.: US 11,213,779 B2
(45) Date of Patent: Jan. 4, 2022

(54) LOW-GRAVITY WATER CAPTURE DEVICE

(71) Applicant: SIERRA NEVADA CORPORATION, Sparks, NV (US)

(72) Inventors: David Michael Hoerr, Madison, WI (US); Ross Remiker, Verona, WI (US); Michael Peterson, Verona, WI (US); Zachary James Setmire, Brookline, NH (US); Mark Milton Weislogel, Newberg, OR (US); Andrew Wollman, Portland, OR (US)

(73) Assignee: Sierra Space Corporation, Broomfield, CO (US)

( * ) Notice: Subject to any disclaimer, the term of this patent is extended or adjusted under 35 U.S.C. 154(b) by 157 days.

(21) Appl. No.: 16/473,594

(22) PCT Filed: Jan. 31, 2018

(86) PCT No.: PCT/US2018/016076
§ 371 (c)(1),
(2) Date: Jun. 25, 2019

(87) PCT Pub. No.: WO2018/144499
PCT Pub. Date: Aug. 9, 2018

(65) Prior Publication Data
US 2020/0147535 A1    May 14, 2020

Related U.S. Application Data

(60) Provisional application No. 62/452,717, filed on Jan. 31, 2017.

(51) Int. Cl.
| | |
|---|---|
| *B01D 45/16* | (2006.01) |
| *B64G 1/60* | (2006.01) |
| *E03B 3/28* | (2006.01) |

(52) U.S. Cl.
CPC .............. *B01D 45/16* (2013.01); *B64G 1/60* (2013.01); *E03B 3/28* (2013.01)

(58) Field of Classification Search
CPC ............................... B01D 45/12; B01D 45/16
See application file for complete search history.

(56) References Cited

U.S. PATENT DOCUMENTS

| | | |
|---|---|---|
| 2,661,076 A | 12/1953 | Walker |
| 3,232,341 A | 2/1966 | Woodworth |
| (Continued) | | |

OTHER PUBLICATIONS

International Search Report for International Application No. PCT/US2018/016076, dated Mar. 28, 2018, 2 pages.

(Continued)

*Primary Examiner* — Robert A Hopkins
(74) *Attorney, Agent, or Firm* — Holland & Hart LLP

(57) ABSTRACT

An apparatus to separate water droplets from an air stream includes an elongated tube having a first end and a second end. The elongated tube includes an opening at a first end of the elongated tube, the opening may be positioned to accept the air stream. A reservoir is positioned at a second end of the elongated tube. A helix structure is positioned within the elongated tube. The helix structure includes an upper surface, a lower surface arranged opposite the upper surface, an outer edge, and a variable pitch along a length of the elongated tube. The variable pitch may provide a variable interior angle between an inner wall of the elongated tube and the upper surface of the helix structure.

20 Claims, 16 Drawing Sheets

(56) References Cited

U.S. PATENT DOCUMENTS

Figure 1:
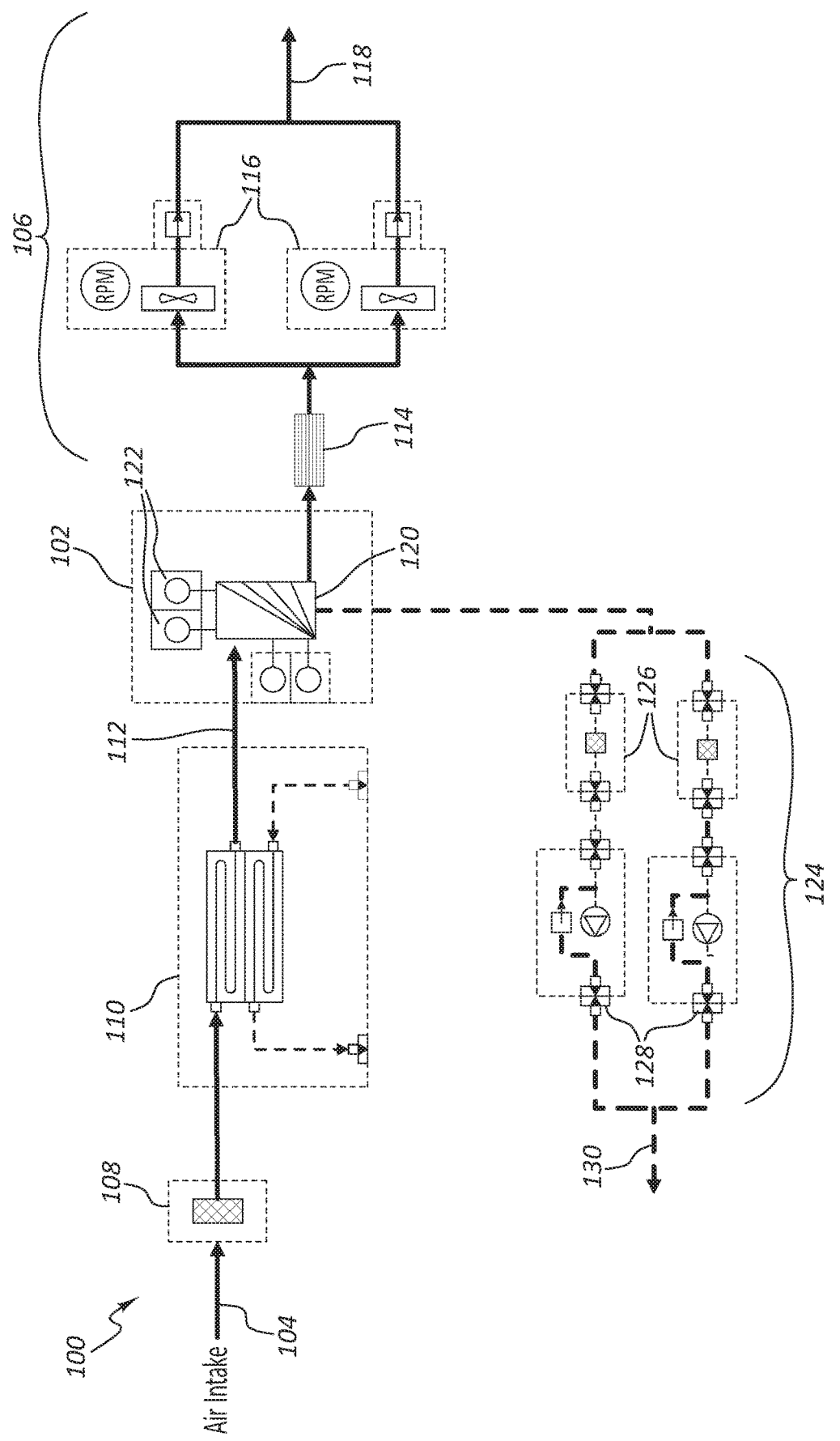
Figure 2:
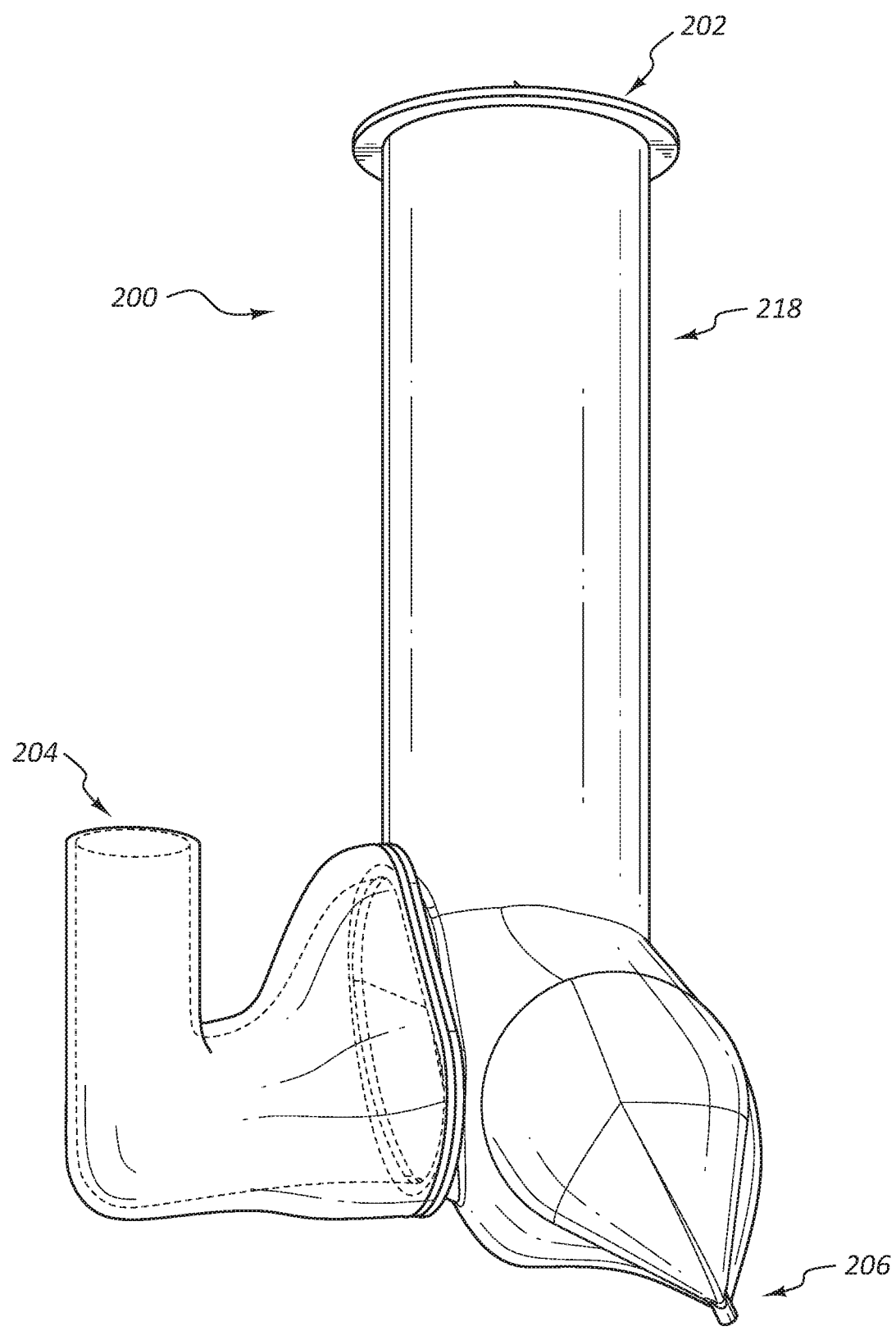

| | | | |
|---|---|---|---|
| 3,394,533 A | | 7/1968 | Li et al. |
| 3,423,294 A | | 1/1969 | Sephton |
| 3,859,063 A | | 1/1975 | Porter et al. |
| 4,162,150 A | | 7/1979 | Carson |
| 4,481,020 A | * | 11/1984 | Lee .................. F04D 13/10 96/214 |
| 4,629,481 A | | 12/1986 | Echols |
| 6,036,749 A | | 3/2000 | Ribeiro et al. |
| 6,619,054 B1 | | 9/2003 | Cargnelli et al. |
| 7,266,958 B2 | | 9/2007 | Milde et al. |
| 2009/0139938 A1 | | 6/2009 | Larnholm et al. |
| 2009/0242490 A1 | | 10/2009 | Hopper |
| 2009/0301699 A1 | | 12/2009 | Karrs et al. |
| 2010/0255738 A1 | | 10/2010 | Woods |
| 2011/0011796 A1 | | 1/2011 | Nickson |

OTHER PUBLICATIONS

Hoerr, Orbitec Water Capture Device (WCD) Parabolic Flight Test, NASA, Dec. 8, 2016 [retrieved on Jun. 21, 2019]. Retrieved from the Internet: <URL: https://flightopportunities.nasa.gov/technologies/167 />. entire document, 1 page.

Weislogel et al., A Novel Device Addressing Design Challenges for Passive Fluid Phase Separations Aboard Spacecraft, Microgravity Science and Technology, vol. 21, 2009, pp. 257-268.

International Search Report and International Preliminary Report on Patentability from Int'l Pat. App. No. PCT/US2019/046918, dated Dec. 23, 2019 (15 pp.).

\* cited by examiner

LOW-GRAVITY WATER CAPTURE DEVICE

TECHNICAL FIELD

The present disclosure relates generally to water capturing devices, and more particularly to water capturing devices in low-gravity environments.

BACKGROUND

Water is not readily available in space. Since the beginning of space travel, there has been a need for smart consumption and recycling and reusing of water. In addition, space environments offer unique challenges of power usage and the space available for these recycling systems. Power must be smartly consumed to power the space environments and ensure power consumption for those environments. Systems and electronics on those space environments may necessitate efficient power consumption and engineering specific to conserve power and consume very little space. Therefore, there is a need for a low-power, low-mass liquid collection apparatus.

An example of collecting water in space is disclosed in U.S. Pat. No. 9,416,026 to Eurica Calif. The '026 patent discloses coating a surface of a spaceship with a drying agent to capture ambient water moisture from space as it impinges on the spaceship. The '026 patent focuses on the external collection of water in space versus the recycling and reusing of water internal to a space vehicle.

SUMMARY

In one embodiment, a method of separating water droplets from a stream of water laden air is described. The water laden air stream may be collected into a semi-closed environment. The water laden air stream is forced into a helical-shaped channel to create a turbulent, rapid circumferential flow of air. The helical-shaped channel has a variable pitch along its length. The water droplets are separated from the air stream within the helical-shaped channel. A rivulet is formed with the separated water droplets. A speed of the air stream is reduced after the water droplets have been separated. The turbulent, rapid circumferential flow of air is transitioned into a less rapid axial flow. The water droplets from the rivulet flow are collected into a reservoir.

In some embodiments, separating water droplets from the air stream may include contacting the air stream against one or more surfaces of the helical-shaped channel. In alternative embodiments, forming the rivulet may include collecting the separated water droplets from the one or more surfaces of the helical-shaped channel. In some instances, the water droplets within the single rivulet flow may be stabilized using the flow of the air stream. The separated water droplets may be guided towards the rivulet with one or more secondary vanes. In some embodiments, forming the rivulet may further include forming a wind-driven cross-axial air stream. In some embodiments, the wind-driven cross-axial rivulet flow may be converted into a streamwise flow aligned with the rivulet. Collecting the water droplets from the rivulet flow into a reservoir may include guiding a flow of the rivulet into the reservoir.

In another embodiment, an apparatus to separate water droplets from an air stream is described. The apparatus includes an elongated tube having a first end and a second end. The elongated tube includes an opening at a first end of the elongated tube, the opening is positioned to accept the air stream. A reservoir is positioned at a second end of the elongated tube. A helix structure is positioned within the elongated tube. The helix structure includes an upper surface, a lower surface arranged opposite the upper surface, an outer edge, and a variable pitch along a length of the elongated tube. The variable pitch provides a variable interior angle between an inner wall of the elongated tube and the upper surface of the helix structure.

In further embodiments, the helix structure may include an initial helical pitch at the first end of the elongated tube. The initial helical pitch may initiate turbulence in an air stream entering the opening. The helix structure may include a transitional pitch that may initiate water droplets in the air stream to separate from the air stream and a final pitch that may induce a lower velocity flow in the air stream from which the water droplets have been separated. In some embodiments, the apparatus may include an initial interior angle between the inner wall of the elongated tube and the upper surface of the helix structure at a first location which may force water droplets into a single rivulet using capillary forces. A transitional interior angle may be between the inner wall of the elongated tube and the upper surface of the helix structure at a second location providing a decreasing potential in the water droplets in a direction of the reservoir. A final interior angle may be between the inner wall of the elongated tube and the upper surface of the helix structure at a third location to transition from the single rivulet flow into the reservoir.

In some embodiments, an air exit may be positioned at the second end of the elongated tube. The air exit may be formed as a hollow cylinder. A vane may bisect the reservoir. The vane may be positioned to retain water droplets in the reservoir while allowing the air stream to exit the apparatus through the air exit. In some embodiments, the apparatus may include a drain access to the reservoir. In some embodiments, the upper surface of the helix structure is smooth and continuous. In some instances, one or more secondary vanes may be positioned on the inner wall of the elongated tube. The one or more secondary vanes may mimic a pitch angle of the helix structure.

In some instances, one or more vanes may be positioned on the upper surface of the helix structure. The one or more vanes may begin near a center point of the helix and may extend towards the outer edge of the helix structure. The helix structure may include a length over diameter ratio of less than four. In some embodiments, the pitch angle may continuously increase along the length of the helix structure. In some embodiments, the interior angle between an inner wall of the elongated tube and the upper surface of the helix structure may continuously decrease along the length of the helix structure.

In a further embodiment, an apparatus to separate water droplets from an air stream is disclosed. The apparatus includes an elongated housing having a first end and a second end, an inlet opening at a first end of the housing, the inlet opening positioned to accept the air stream, a reservoir positioned at a second end of the elongated tube, and a helix structure positioned within the elongated tube. The helix structure includes an upper surface, a variable pitch along a length of the housing, the variable pitch providing a variable interior angle between an inner wall of the elongated tube and the upper surface of the helix structure, an initial helical pitch at the first end of the elongated tube, the initial helical pitch initiating turbulence in the air stream entering the opening, and a transitional pitch that initiates water droplets in the air stream to separate from the air stream.

In some embodiments, the helix structure further includes a final pitch that slows the air stream from which the water droplets have been separated.

Figure 3:
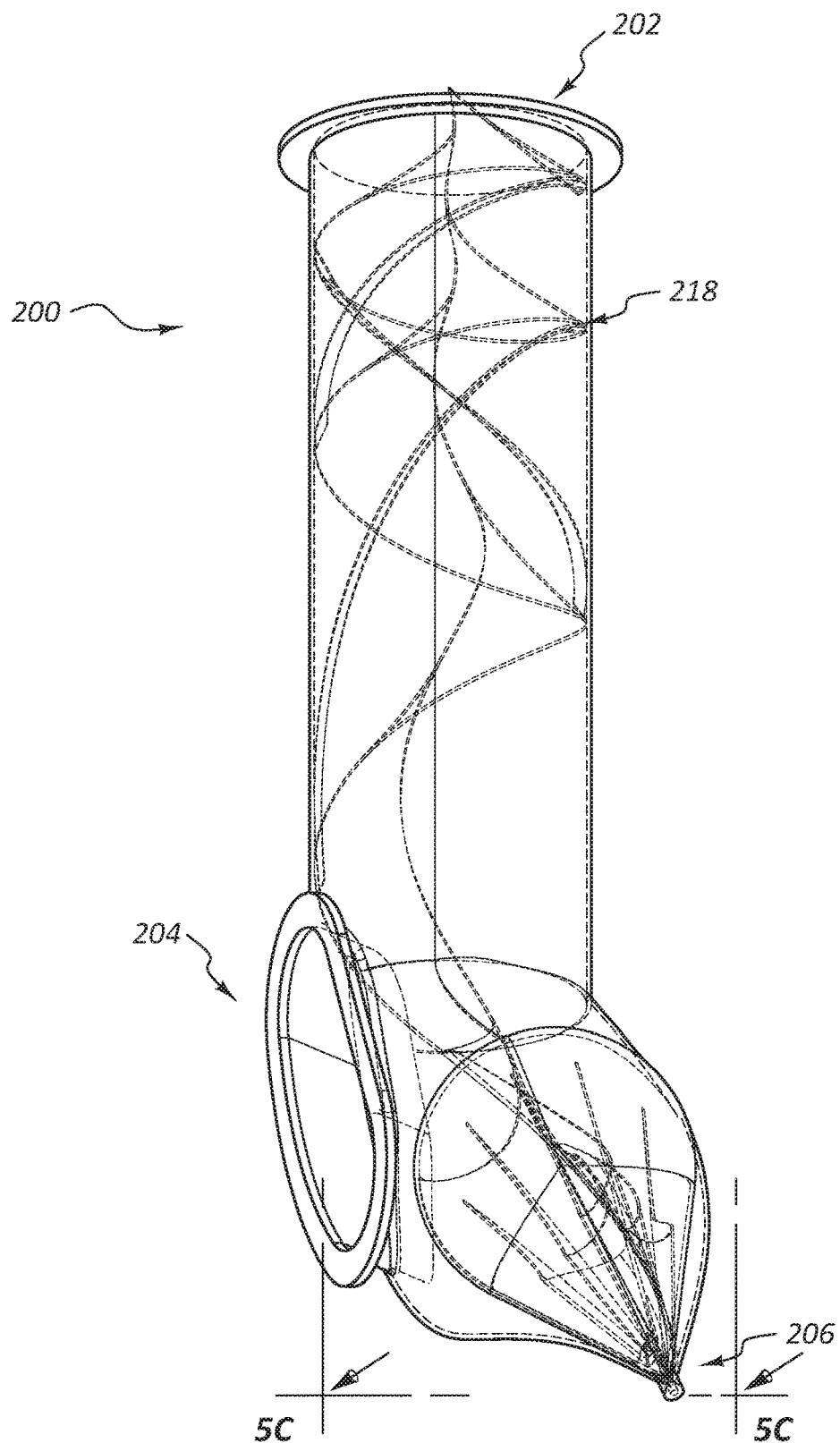

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 1 illustrates an example of an environment of a low-gravity water capture device;

FIG. 2 is a perspective view of an exemplary low-gravity water capture device;

FIG. 3 is a perspective view of an exemplary low-gravity water capture device showing internal features in broken line;

FIG. 4 is a perspective view of the exemplary low-gravity water capture device of FIG. 3;

FIG. 5A is a cutaway view of the exemplary low-gravity water capture device of FIG. 4 taken along lines 5A-5A;

FIG. 5B is a cutaway view of the exemplary low-gravity water capture device of FIG. 4 taken along lines 5B-5B;

FIG. 5C is a cutaway view of the exemplary low-gravity water capture device of FIG. 3 taken along lines 5C-5C;

FIG. 5D is a cutaway view of the exemplary low-gravity water capture device of FIG. 4 taken along lines 5D-5D;

FIG. 5E is an exemplary view of a helix structure of the low-gravity water capture device of FIG. 4;

FIG. 6 is a top perspective view of another exemplary low-gravity water capture device;

FIG. 7 is a top perspective view of the exemplary low-gravity water capture device of FIG. 6 showing internal features in broken line;

FIG. 8 is a bottom perspective view of the exemplary low-gravity water capture device of FIG. 6;

FIG. 9A is a cut-away view of the exemplary low-gravity water capture device of FIG. 8 taken along lines 9A-9A;

FIG. 9B is a cut-away view of the exemplary low-gravity water capture device of FIG. 6 taken along lines 9B-9B;

FIG. 9C is an exemplary view of a helix structure of the low-gravity water capture device of FIG. 6;

FIG. 10 is a truncated cutaway view of an exemplary low-gravity water capture device showing secondary vanes;

FIG. 11 is side view schematic of an exemplary low-gravity water capture device;

FIG. 12 is an example of a method relating to low-gravity water capture device; and FIG. 13 is another example of a method relating to low-gravity water capture device.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Water is a scarce resource in outer space. It is not readily available and must be mined from extraterrestrial resources if it is to be collected at all in outer space, which is a currently developing technology. Therefore, all water used in spacecraft is carried from earth. As such, the preservation, recycling, and reusing of water in extraterrestrial living systems may reduce the amount of water initially needed at the onset of an extraterrestrial mission. Water may be harvested and recycled from unlikely sources. However, power is also a scarce resource in space and must be used wisely. Therefore, a solution is needed to harvest water from on board resources using at little power as possible. The solution though, must also be lightweight and relatively small as to not encumber the mission or add unnecessary extra weight to the space vessel.

FIG. 1 illustrates an example of a potential system 100 which may utilize a low-gravity water separator 102. The system 100 may include the low-gravity water separator 102, an air intake 104, and an air output system 106. The air intake 104 may be cabin air intake. The air intake 104 may pass air through a filter 108, such as a HEPA filter or the like. After air passes through the filter 108, air may enter a temperature and humidity control device 110. The temperature and humidity control device 110 may include a multitude of devices including a heat exchanger. The temperature and humidity control device 110 may emit an air stream laden with water droplets along path 112. In some embodiments, the temperature and humidity control device 110 may output water laden air using a fan or other device to generate a force on the air. In some embodiments, gravity may alternatively and/or additionally act on the water laden air. The water laden air may enter the low-gravity water separator 102. The low-gravity water separator 102 may separate the water droplets from the air stream. The low-gravity water separator 102 may then discharge air free of water droplets into the air output system 106. In some embodiments, the air output system 106 may include an evaporator 114 and one or more fans 116 to circulate the air and/or pull the air from the water separator 102. In some embodiments, the air output system 106 may output air to a ducting and ventilation system (not shown) along path 118.

The low-gravity water separator 102 may additionally incorporate a water-output device 120 which may enable water to be discharged from the low-gravity water separator 102. The water-output device 120 may incorporate and/or communicate with one or more sensors 122 which may enable the water-output device 120 to automatically pull water from the low-gravity water separator 102. The water-output device 120 may discharge water to a liquid-output system 124. The liquid-output system 124 may include one or more pumps and one or more filters. The liquid-output system 124 may discharge water to a liquid processing system (not shown) along path 130.

FIG. 2 is a perspective view of an exemplary low-gravity water separator 200. The low-gravity water separator 200 may be an example of the low-gravity water separator 102 described with reference to FIG. 1. The low-gravity water separator 200 may include an air inlet 202, an air outlet 204, and a water discharge 206. In some embodiments, the air outlet 204 may be cylindrical-shaped and create a sort of chimney for air free of water droplets to be discharged. The air outlet 204 may enable air to be discharged from the low-gravity water separator 200. The air outlet 204 may be oriented in any desired direction.

FIG. 3 is a perspective view of the low-gravity water separator 200 showing internal features, such as the helix structure 218, shown in broken lines without the chimney air outlet component. FIG. 4 is another perspective view of the low-gravity water separator 200 without the chimney air outlet component. FIG. 5A is a cutaway view of the low-gravity water separator 200 along lines 5A-5A in FIG. 4. FIG. 5B is another cutaway view of the low-gravity water separator 200 along lines 5B-5B in FIG. 4. FIG. 5C is a further cutaway view of the low-gravity water separator 200 along lines 5C-5C in FIG. 3. FIG. 5D is a still further cutaway view of the low-gravity water separator 200 along lines 5D-5D in FIG. 4. FIG. 5E is a view of the helix structure 218 of the low-gravity water separator 200 of FIG. 4.

The low-gravity water separator 200 may include an air inlet 202, an air outlet 204, and a water discharge 206. The low-gravity water separator 200 may comprise an elongated tube 208 (also referred to as a housing or an elongate housing) with an inner wall 210 and an outer wall 212. An opening 214 to the low-gravity water separator 200 may be on a first end 216 of the elongated tube 208. The opening 214 may be positioned to accept an air stream. For example, the opening 214 of the low-gravity water separator 200 may be positioned proximate an outlet of a heat exchanger or another device which may output water laden air that includes a plurality of water droplets—also referred to as droplet laden air (see e.g., FIG. 1).

A helix structure 218 may be positioned within the elongated tube 208. The helix structure 218 may guide the droplet laden air from the opening 214 at the first end of the elongated tube 208 to a second end 220 of the elongated tube 208. When the droplet laden air reaches the second end 220, at least some of the water droplets may be separated from the air stream and the water droplets may be captured in a reservoir 222 proximate the second end 220 of the elongated tube 208. The air stream may continue past the reservoir 222 and release into an air output system (e.g., air output system 106 shown in FIG. 1).

The geometry of the helix structure 218 may cause water droplets to separate from the air stream as the air travels through the helix structure 218 to the second end 220 of the low-gravity water separator 200. In some embodiments, the flow path and velocity of the air stream may cause water droplets to separate from the air stream. Contact between the water laden air and a surface (e.g., helix structure 218 or inner wall 210) may create separation of the water droplets from the air as well. The helix structure 218 may have an upper surface 224 and a lower surface 226 arranged opposite the upper surface 224. The helix structure 218 may additionally include an outer edge 228. The outer edge 228 of the helix structure 218 may continuously contact the inner wall 210 of the elongated tube 208.

The helix structure 218 may have a varying helical pitch as the helix structure 218 traverses from the first end 216 of the elongated tube 208 toward the second end 220 of the length of the elongated tube 208. For example, the helix structure 218 may have an initial helical pitch $p_1$, a transitional helical pitch $p_2$, and a final helical pitch $p_3$. The pitch of a helix may be defined as the height of a complete turn of a single helix structure, measured parallel to the axis of the helix structure or as the distance between revolutions of the helix. The varying helical pitch of the helix structure 218 may increase as the helix structure 218 traverses the elongated tube 208. The initial helical pitch $p_1$ may be smaller and/or shorter than the transitional helical pitch $p_2$, which may in turn be smaller and/or shorter than the final helical pitch $p_3$.

The initial helix pitch $p_1$ may be governed by an effective flow area of the cross-axial circumferential air stream as it enters the helix structure 218. The pitch $p_1$ may allow an acceptable restriction on the air stream which may cause a desired pressure drop and air speed. If the pitch $p_1$ is too small, the air stream may face an unnecessary restriction which may cause excessive air flow acceleration which may lead to an unnecessary pressure drop and an associated unnecessary increase in fan power. The level of necessary air flow acceleration or peak velocity may be a factor of the size of the water droplets dispersed within the gas stream along with gas viscosity, and a density difference between the liquid and gas phases. In some embodiments, smaller water droplets may require higher peak gas velocities to be spun out of the air stream in the same amount of time that larger water droplets would spin out in lower air flow velocities.

The initial $p_1$ may be a factor of a ratio of gas flow residence time-to-water droplet drift time. The water droplet drift time may be a maximum average time for a water droplet of a specific size to travel from the axis of the device to the inner wall 210 of the elongated tube 208. The gas flow residence time may be an average time for the entire gas volume to be completely changed in the low-gravity water separator 200. Another way to describe gas flow residence time is the length of time for air entering the low-gravity water separator 200 to exit the low-gravity water separator 200. This may be determined by a volume to volumetric flow rate ratio. The volume to volumetric flow rate ratio may be a ratio of internal air volume to volumetric air flow rate, for example, the amount of volume contained within the low-gravity water separator 200 divided by the rate at which the volume of air is exchanged within the low-gravity water separator 200 as follows:

$$\frac{\text{Device Air Volume}(\text{ft}^3)}{\text{Air Volume per Time}\left(\frac{\text{ft}^3}{\text{sec}}\right)} =$$

Average time to exchange all air in the device with new air (sec)

The volume to volumetric flow rate ratio may be greater than the water droplet drift time. A ratio as such may enable a water droplet to drift towards and collide with the inner wall 210 and/or the upper surface 224 before flowing out the air outlet 204. A residence time to drift time ratio may be in a range of the volume to volumetric flow rate ratio of approximately 5000 based on an initial water droplet size. In some embodiments, an initial helical pitch $p_1$ may be sized approximately between ½ and 1 ½ times a diameter of the elongated tube 208 to achieve this ratio.

The transitional helical pitch $p_2$ may be a portion of the overall length L of the helix structure 218 to enable a transition between the initial helical pitch $p_1$ to the final helical pitch $p_3$. The final helical pitch $p_3$ may transition the gas velocity field at the air outlet 204 to a mostly axial air stream. For example, the final helical pitch $p_3$ may reduce and/or remove the tangential air flow velocity component from an initial tangential air flow velocity. The tangential air flow velocity may also include a measure of the air flow rate of revolution about the helix structure 218. In some embodiments, the final helical pitch $p_3$ may comprise most of the length L of the elongated tube 208 while maintaining an acceptable initial helical pitch $p_1$. The final helical pitch $p_3$ may also produce a smooth transition from the initial helical pitch $p_1$ to the reservoir 222 and air outlet 204.

The changing helical pitch may also cause an interior angle between the upper surface 224 of the helix structure 218 and the inner wall 210 of the elongated tube 208 to change. For example, an initial interior angle $\alpha_1$ between the upper surface 224 and the inner wall 210 may be less than 90°. In some embodiments, the initial interior angle $\alpha_1$ may be approximately 50° to 80°. The initial angle $\alpha_1$ may change as the initial helical pitch $p_1$ transitions to the transitional helical pitch $p_2$.

The initial angle $\alpha_1$ may transition to a transitional interior angle $\alpha_2$ between the upper surface 224 and the inner wall 210. The transitional interior angle $\alpha_2$ may be sized such that it smoothly and relatively constantly (i.e. linearly) changes the interior angle formed by the upper surface 224 and the inner wall 210 between reservoir 222 and inlet.

The final interior angle $\alpha_3$ may begin at the end range of the transitional interior angle $\alpha_2$ with a range of approximately 2° to 10°. The continuously diminishing interior angles $\alpha$, $\alpha_2$, $\alpha_3$ may aid in water flow from the air inlet 202 of the low-gravity water separator 200 to the reservoir 222.

The reservoir 222 may collect water droplets as water flows down the helix structure 218. The water droplets, as will be discussed with reference to FIG. 11, may be separated from the air stream as the air stream travels through the helix structure 218. The helix structure 218 and elongated tube 208 may gradually transition into the reservoir 222. For example, the reservoir 222 may be located in the second end 220 of the low-gravity water separator 200 and the transition between the elongated tube 208 and the reservoir 222 may be a smooth and continuous curved geometry 240.

The reservoir 222 may comprise a bulbous cavity 242. The bulbous cavity 242 may have an entry point 244 which may enable the flow of water from the final interior angle $p_3$ to the water reservoir 222. The water reservoir 222 may be bisected by a stabilizing vane 246. The stabilizing vane 246 may maintain water within the reservoir 222 and may prevent water laden air from being dispersed into the atmosphere. The stabilizing vane 246 may additionally guide water droplets towards one or more reservoir vanes 248. The one or more reservoir vanes 248 may use capillary action to maintain the water in the reservoir 222. Capillary action, which may arise due to the interaction of surface tension of a liquid and adhesive forces acting between the liquid and adjacent surfaces, may cause the water to minimize its surface area exposed to the air. For example, the water may naturally seek minimum inter-facial energy. In the reservoir 222, the water may pull itself into the series of reservoir vanes 248 where the vanes 248 are closest together to minimize an exposed water surface. The reservoir vanes 248 may be spaced apart such that water, or another liquid, may use surface tension or cohesion and adhesive forces between the liquid and the reservoir vanes 248 to maintain the liquid in the reservoir 222.

For example, with reference to FIG. 5E, the reservoir vanes 248 may be arranged at various angles $\alpha_4$, $\alpha_5$, $\alpha_6$, and $\alpha_7$ relative to each other. The angles $\alpha_4$, $\alpha_5$, $\alpha_6$, and $\alpha_7$ may all protrude from a common area or point 264. This point 264 is typically contained within the reservoir 222 (as shown in the Figures) or may be a point or area located outside the confines of the low-gravity water separator 200. In some embodiments, the various angles $\alpha_4$, $\alpha_5$, $\alpha_6$, and $\alpha_7$ may all comprise the same angle separating each vane 248. In other embodiments, each angle $\alpha_4$, $\alpha_5$, $\alpha_6$, and $\alpha_7$ may be distinct from the others. In some embodiments, the angles $\alpha_4$, $\alpha_5$, $\alpha_6$, and $\alpha_7$ may be continuous as the vanes 248 extend outward from the point 264. For example, the angle $\alpha_4$, $\alpha_5$, $\alpha_6$, and $\alpha_7$ separating adjacent vanes may be constant along a length of each vane 248. In other embodiments, the angles $\alpha_4$, $\alpha_5$, $\alpha_6$, and $\alpha_7$ may be variable as the vanes 248 extend away from the point 264. For example, the vanes 248 may have a curvature or variable geometry that causes the angles $\alpha_4$, $\alpha_5$, $\alpha_6$, and $\alpha_7$ to change along the length of each vane 248. The angles $\alpha_4$, $\alpha_5$, $\alpha_6$, and $\alpha_7$ may be constant or variable angles in the range of about 10 degrees to about 45 degrees, and more particularly in the range of about 10 degrees to about 20 degrees.

The spacing between, the shape and size, and the position within reservoir 222 of stabilizing vanes 248 may be determined based on a target Weber number. A Weber number is a dimensionless number for analyzing fluid flows at an interface between two different fluids. The Weber number is calculated as a ratio between a dynamic pressure of air and a capillary pressure of the water. A final calculation of the Weber number is indicative of whether the kinetic energy of the air or interfacial energy of the water is dominant. In the current situation, the Weber number should indicate a dominant interfacial energy of the water to indicate the water will remain in a coalesced state in the reservoir 222 and not disperse into droplets. The Weber number may also be calculated by either of the following equations:

$$We = \frac{\text{Dynamic pressure of air}}{\text{Capillary pressure of water}}$$

$$We = \frac{\text{Kinetic energy of air}}{\text{Interfacial energy of water}}$$

To achieve water stability, the Weber number may be in the range of about 8 to about 12.

In further embodiments, a stability rule may be used to determine a distance between the stabilizing vanes 248. For example, to achieve water stability, a stabilizing calculation may be performed. The calculation may performed using the following equation for air/water separation:

$$V_{air}^2 * D < \sim 20 \frac{\text{ft}^2}{s^2}$$

V_air may be air velocity. D may be distance between the stabilizing vanes 248 at the interface between the water and the air. In some embodiments, the reservoir vanes 248 may additionally be of sufficient height to maintain an adequate amount of liquid within the reservoir 222. The water discharge 206 may be positioned proximate a bottom end 250 reservoir 222.

In some embodiments, the water discharge 206 may enable water to be drawn from the stabilizing vanes 248 within the reservoir 222. In some embodiments, the low-gravity water separator 200 may incorporate an automated drain cycle which may utilize liquid level sensing. The water discharge 206 may be controlled by sensing an amount of water present in the reservoir 222 (e.g., water-output device 120 shown in FIG. 1). When the reservoir 222 is full, a pump (not shown) may be started. The pump may cease operation when the reservoir 222 is empty. In some embodiments, capacitive level sensors (e.g., sensors 122, FIG. 1) may be used. Capacitive level sensors may be capable of sensing through a wall and may be positioned on an outside of the reservoir 222 to determine when the reservoir is 'full' and when it is 'empty.'

In some embodiments, the low-gravity water separator 200 may include a lip 252 proximate the opening 214 of the elongated tube 208. The lip 252 may mate with another piece of equipment such as a heat exchanger, tube, or other device and/or apparatus which may transfer droplet laden air from a source to the opening 214. The opening 214 may additionally and/or alternatively incorporate a multitude of other attachment features such as a male or female threaded end, an interference fit device, or the like.

Likewise, the air outlet 204 may comprise an opening 254 with a lip 256. The lip 256 may provide a clamping surface to attach an apparatus to the air outlet 204. An apparatus may include, for example, a tube or other transfer structure to move and/or guide air to an air output system (e.g., air output system 106 shown in FIG. 1). The opening 254 may additionally and/or alternatively incorporate other connection mechanisms such as threaded ends, interference fits, or the like. The air outlet 204 may form a sort of chimney shaped structure with an interior wall 259. The wall 259 protrudes into the reservoir 222 and may create an interior corner 261. The interior corner 261 may capture any stray wall-bound water droplets and highly wetted liquid films from migrating out of the air outlet 204.

Figure 4:
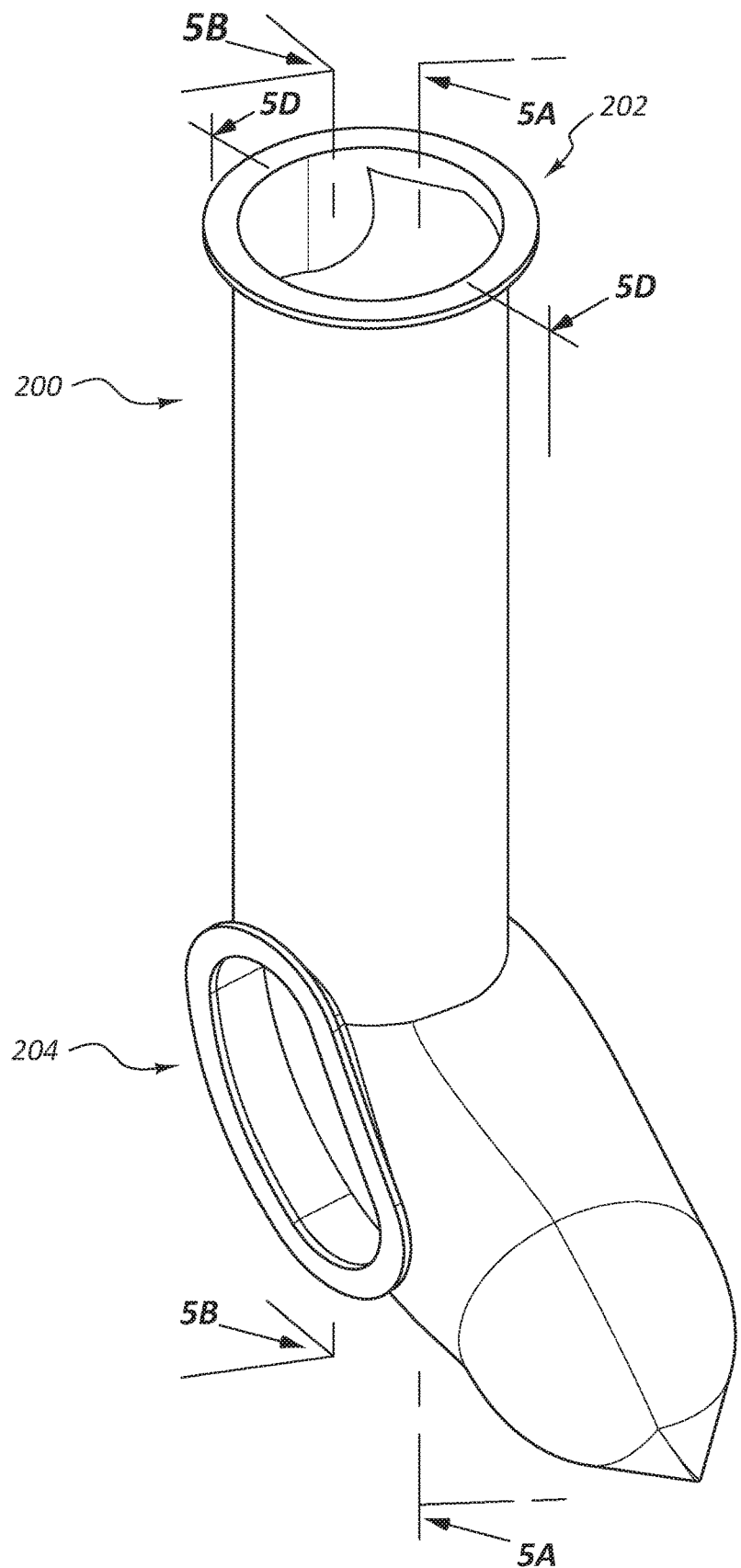
Figures 5A, 5B:
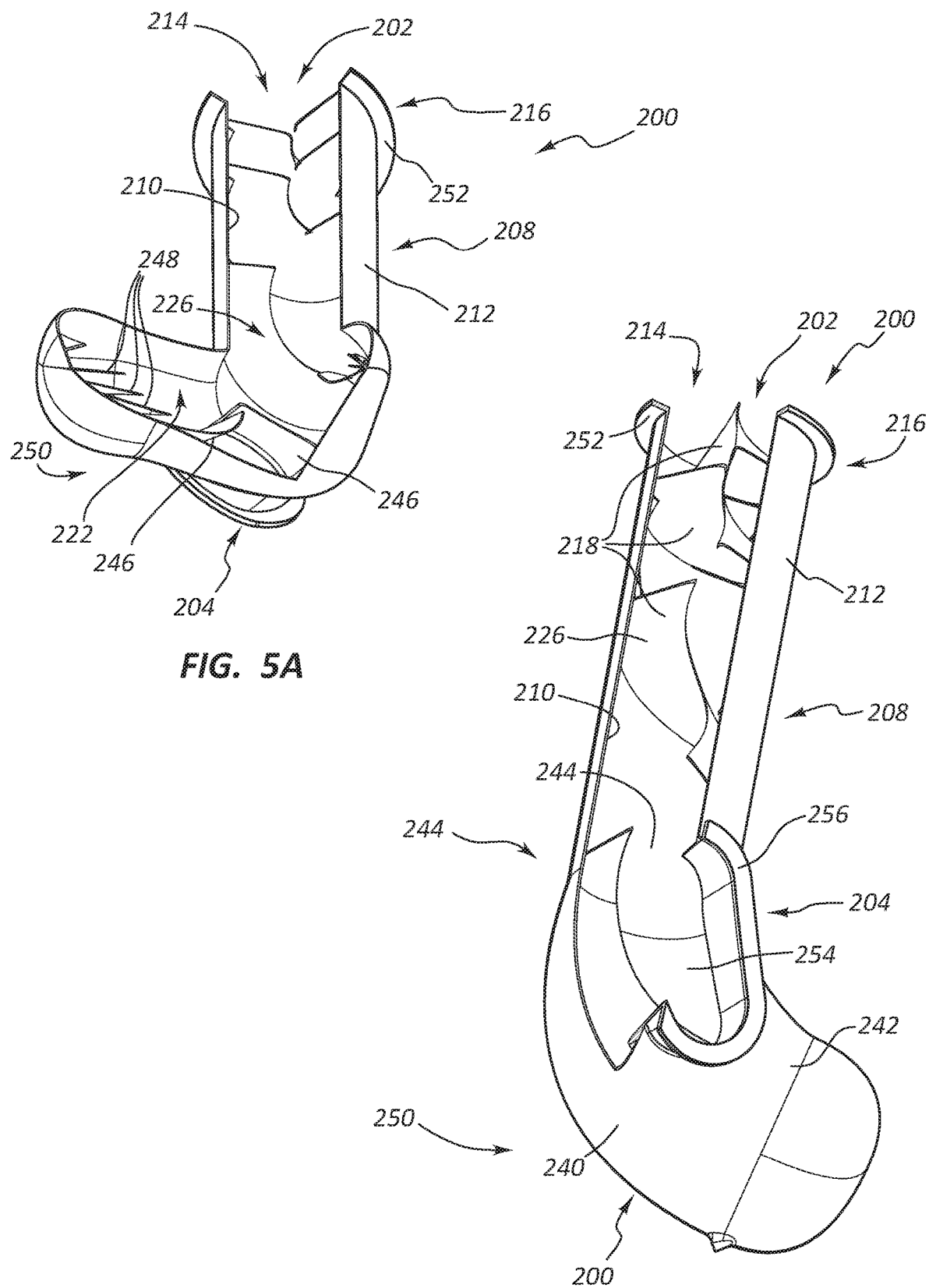
Figure 5C:
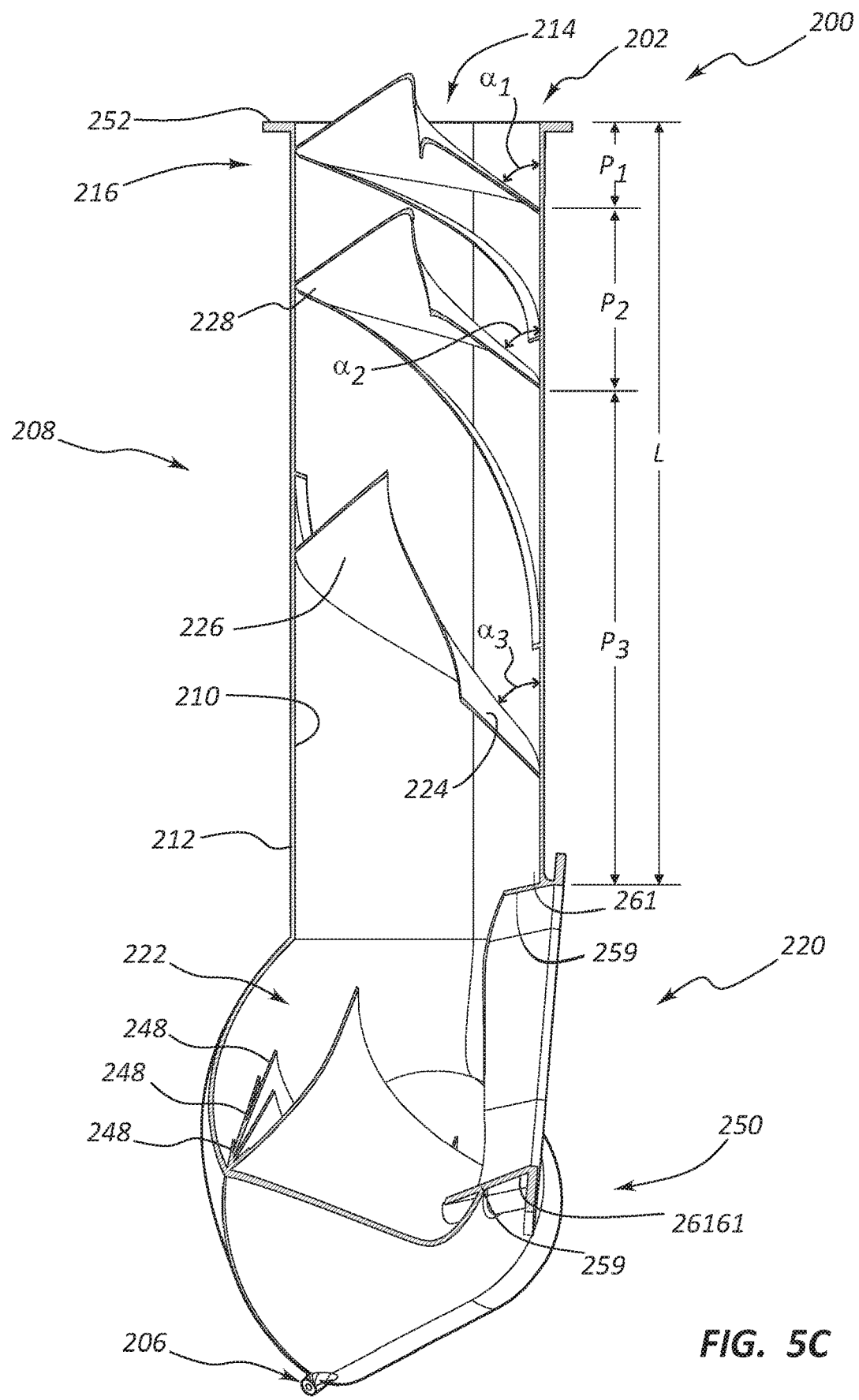
Figure 5D:
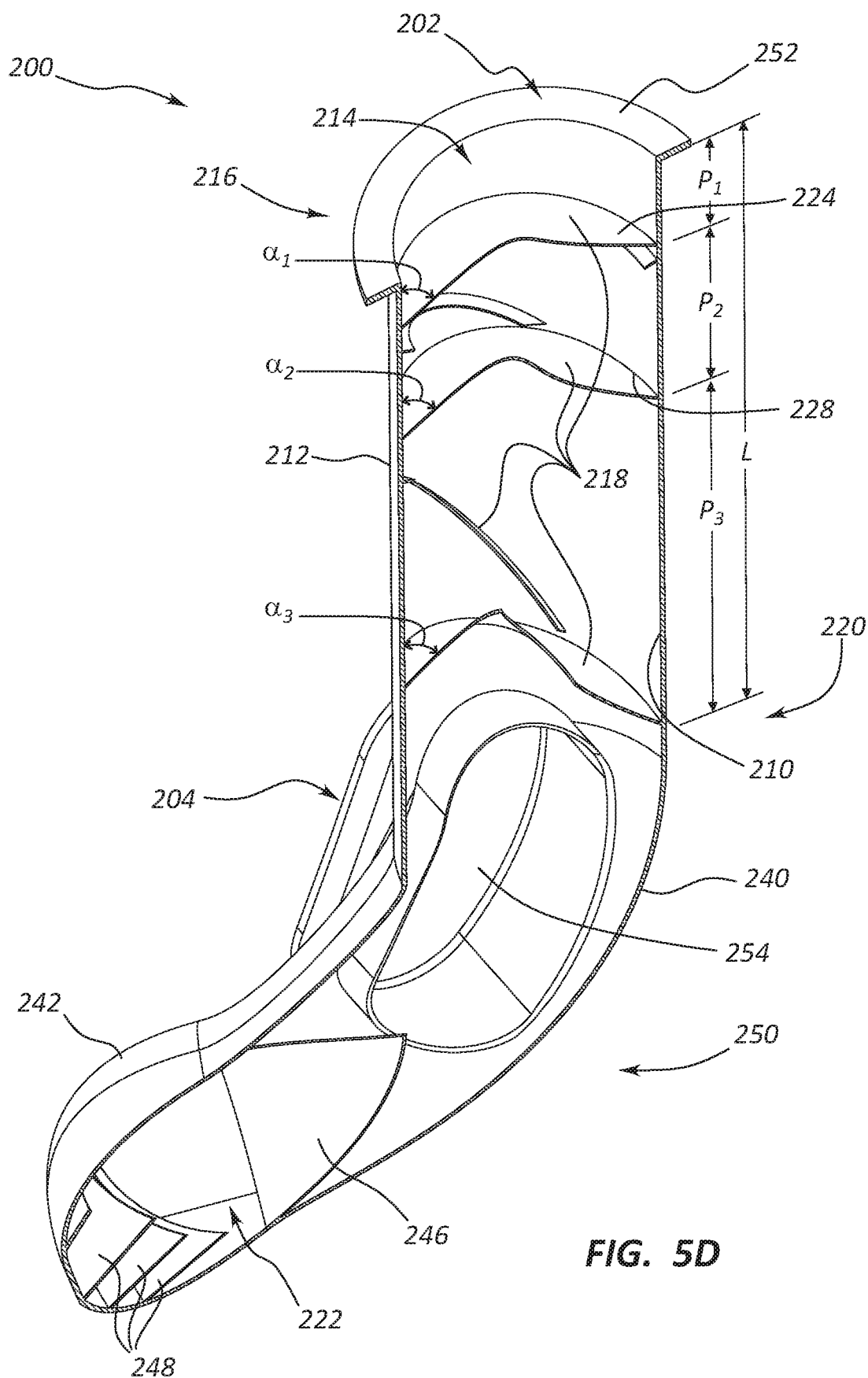
Figure 5E:
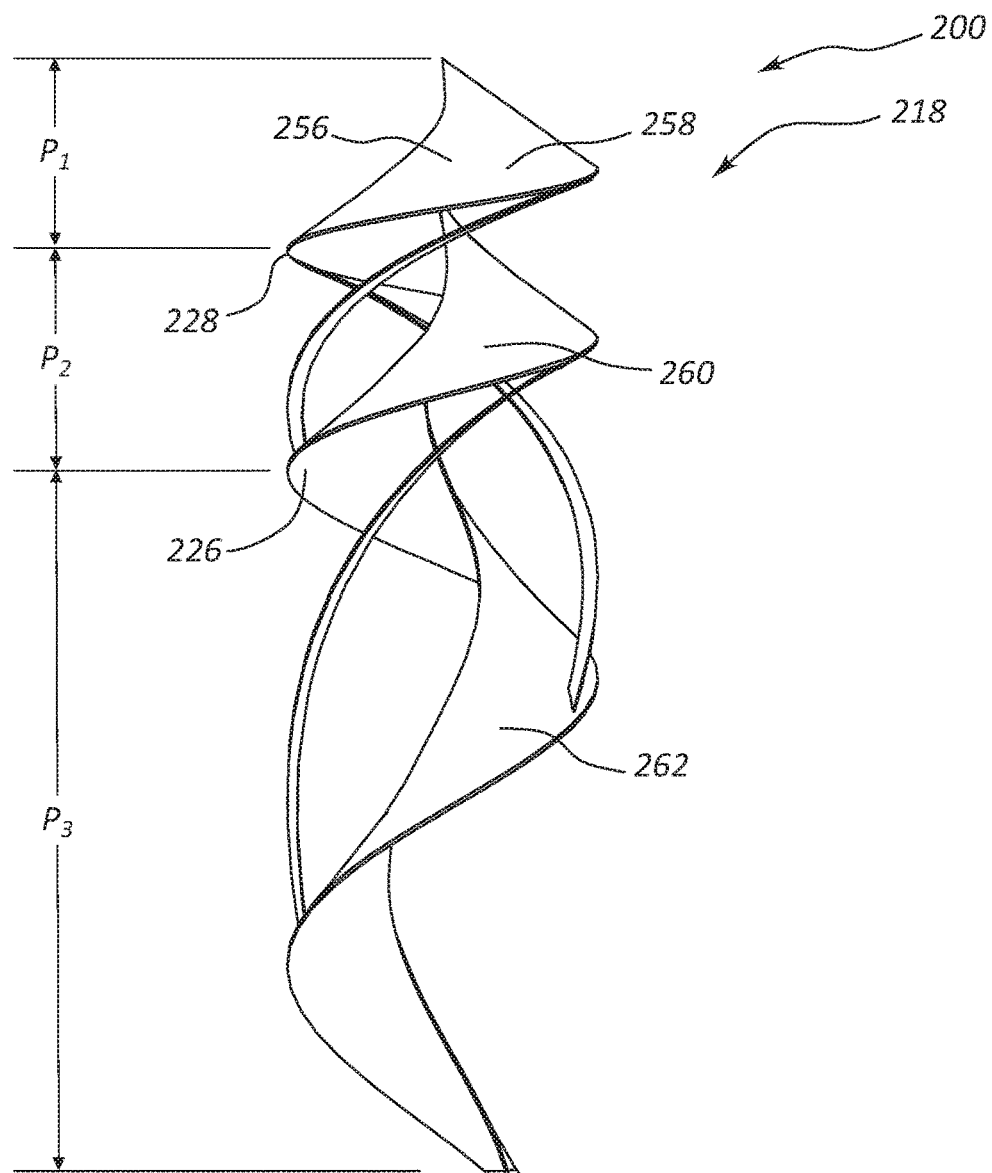

FIG. 5E is a view of the helix structure 218 of the low-gravity water separator 200 of FIG. 4. In some embodiments, the helix structure 218 may have various features on the upper surface 224 of the helix structure 218. For example, the helix structure 218 may have a groove in the upper surface 224 of the first helix turn 258. The second helix turn 260 and the third helix turn 262 may also have a groove in the upper surface 224. The groove may use surface tension and/or capillary forces to guide the water towards the edge 228 of the helix structure 218. This may stabilize the water flow as it transitions towards the reservoir 222. In other embodiments, a tertiary vane may be provided as a protruding feature on the upper surface 224 of the helix structure 218 to provide a stabilizing force for a water rivulet and/or water droplets. In some embodiments, a water rivulet may be a small stream of coalesced or gather water particles or water droplets. Either feature, a groove or a tertiary vane, may direct water droplets to the outer edge 228 of the helix structure 218 towards a rivulet. The groove or tertiary vane may provide stability to water rivulets.

Figure 6:
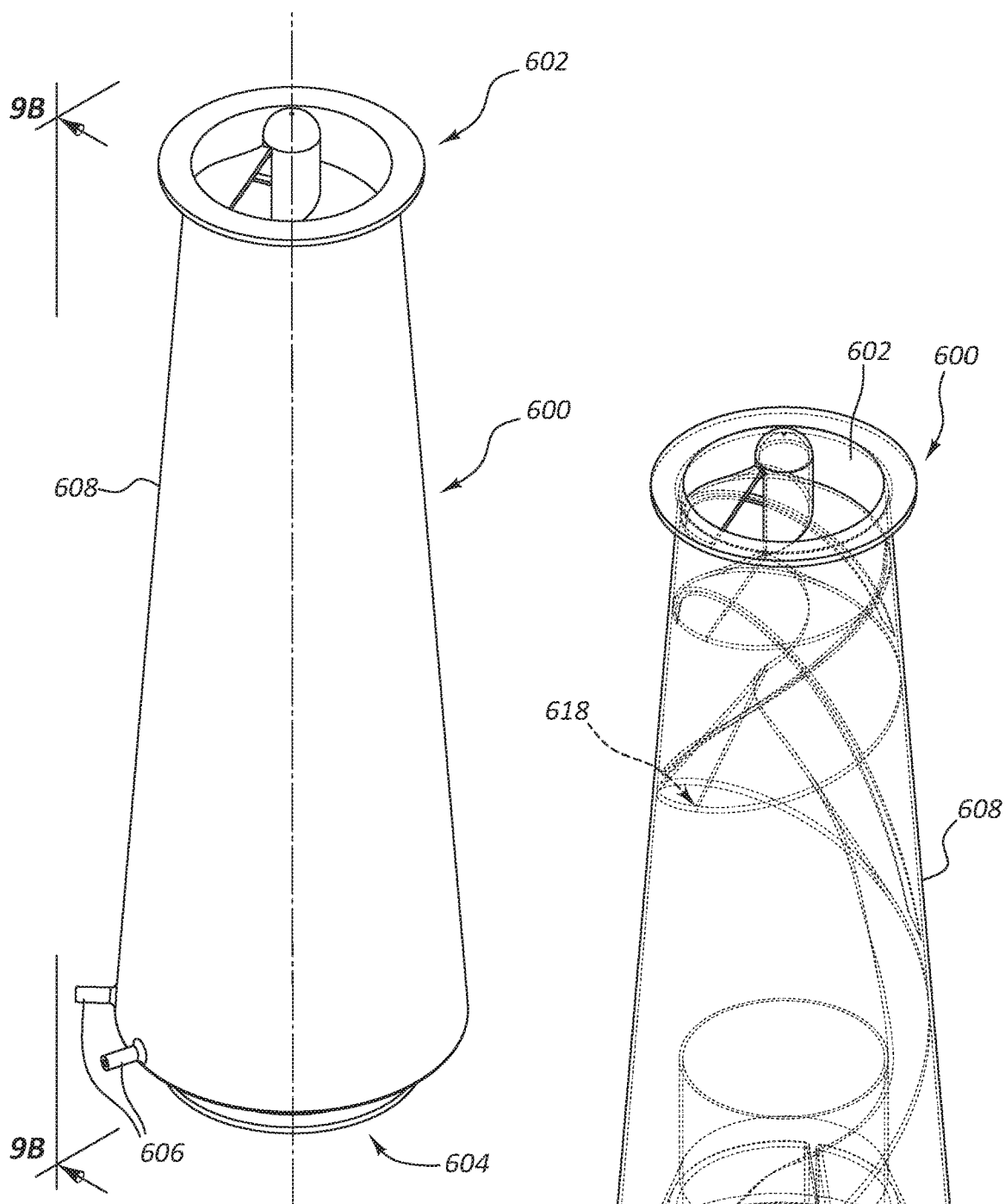
Figure 7:
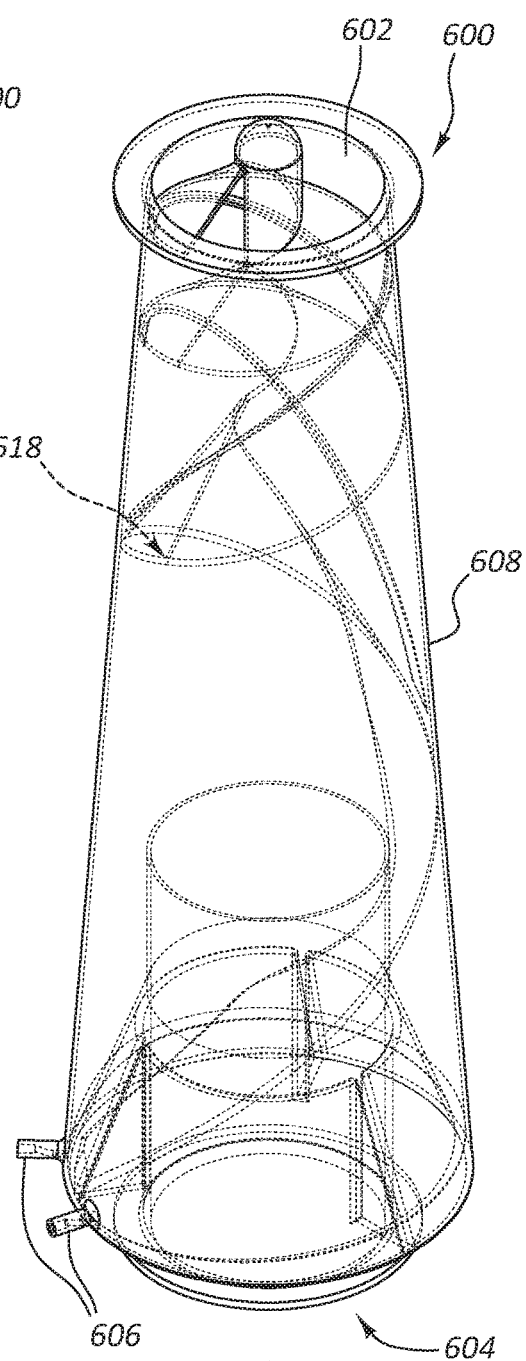
Figure 8:
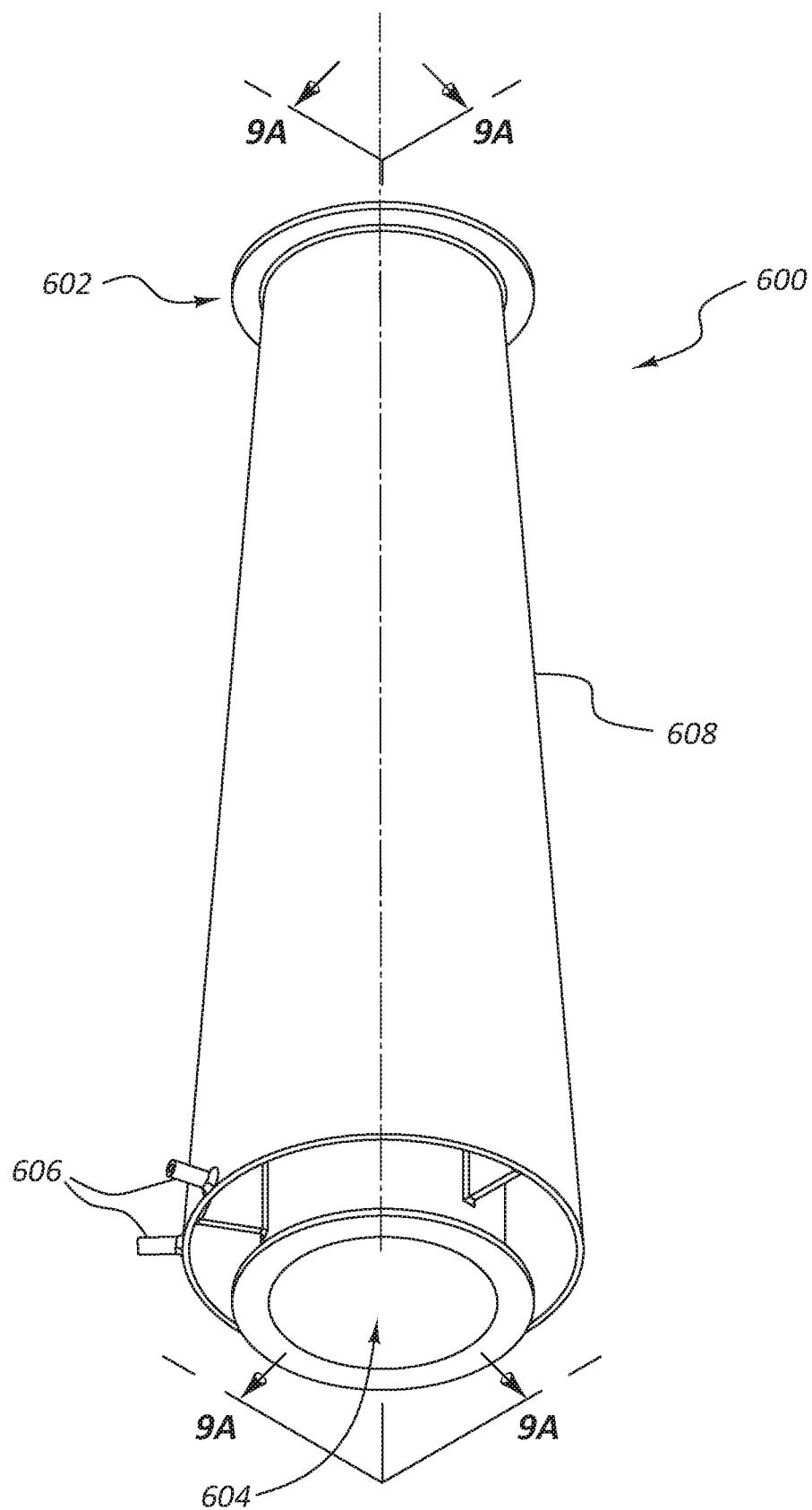

FIG. 6 is a perspective view of an alternative configuration for a low-gravity water separator 600. The low-gravity water separator 600 may incorporate similar features as the low-gravity water separator 102, 200 discussed with reference to FIGS. 1-5D. The low-gravity water separator 600 may include an elongated tube 608. The elongated tube 608 may have a cylindrical shape or may be tapered and/or conical-shaped. The elongated tube 608 may include an air inlet 602, an air outlet 604, and one or more water discharges 606. FIG. 7 is a perspective view of the low-gravity water separator 600 with internal features, such as the helix structure 618, shown in broken lines. FIG. 8 shows a plan view of the low-gravity water separator 600.

Figure 9A:
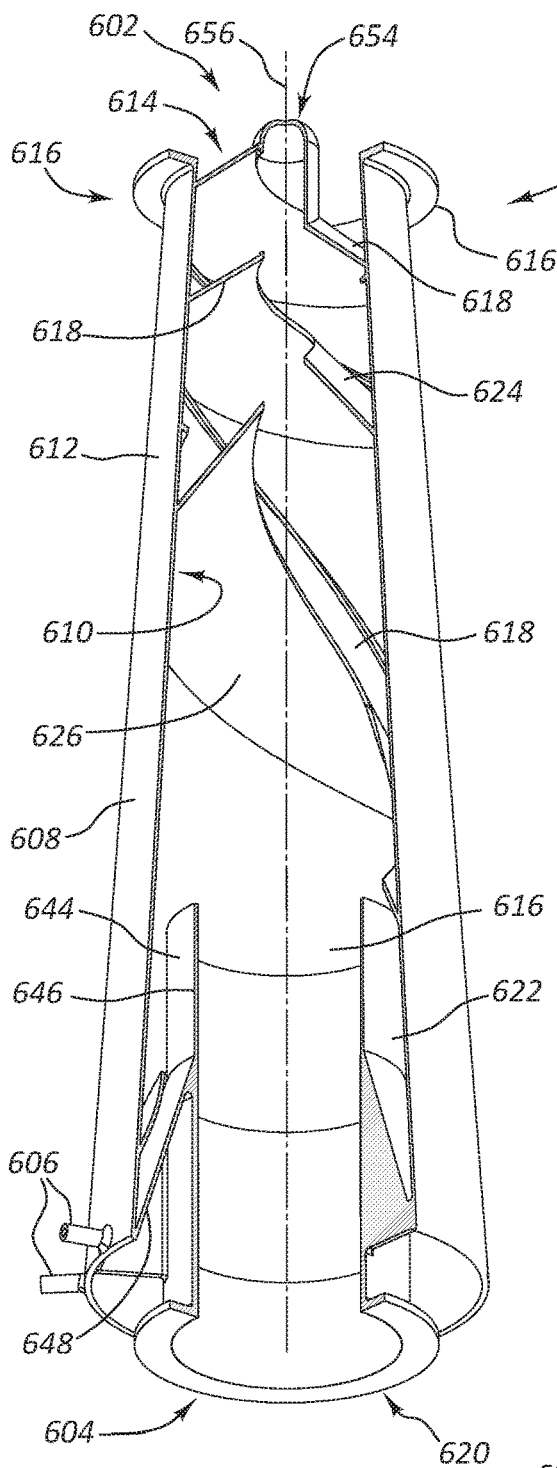
Figure 9B:
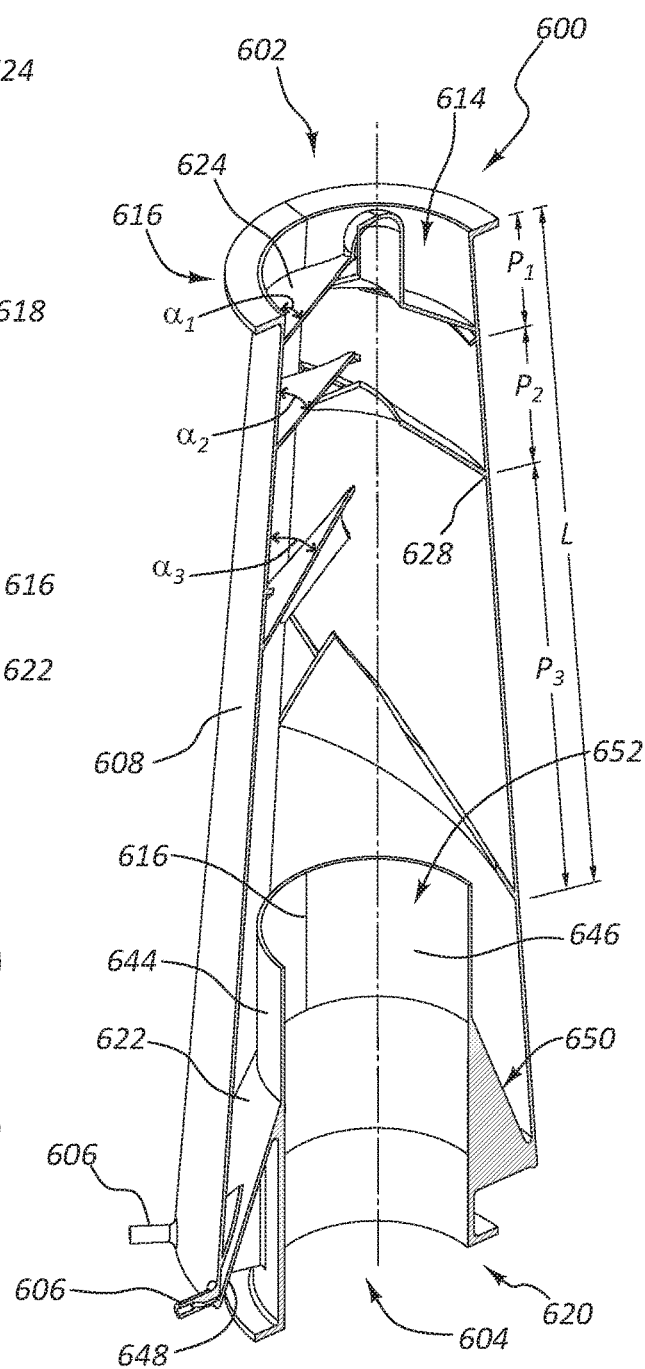
Figure 9C:
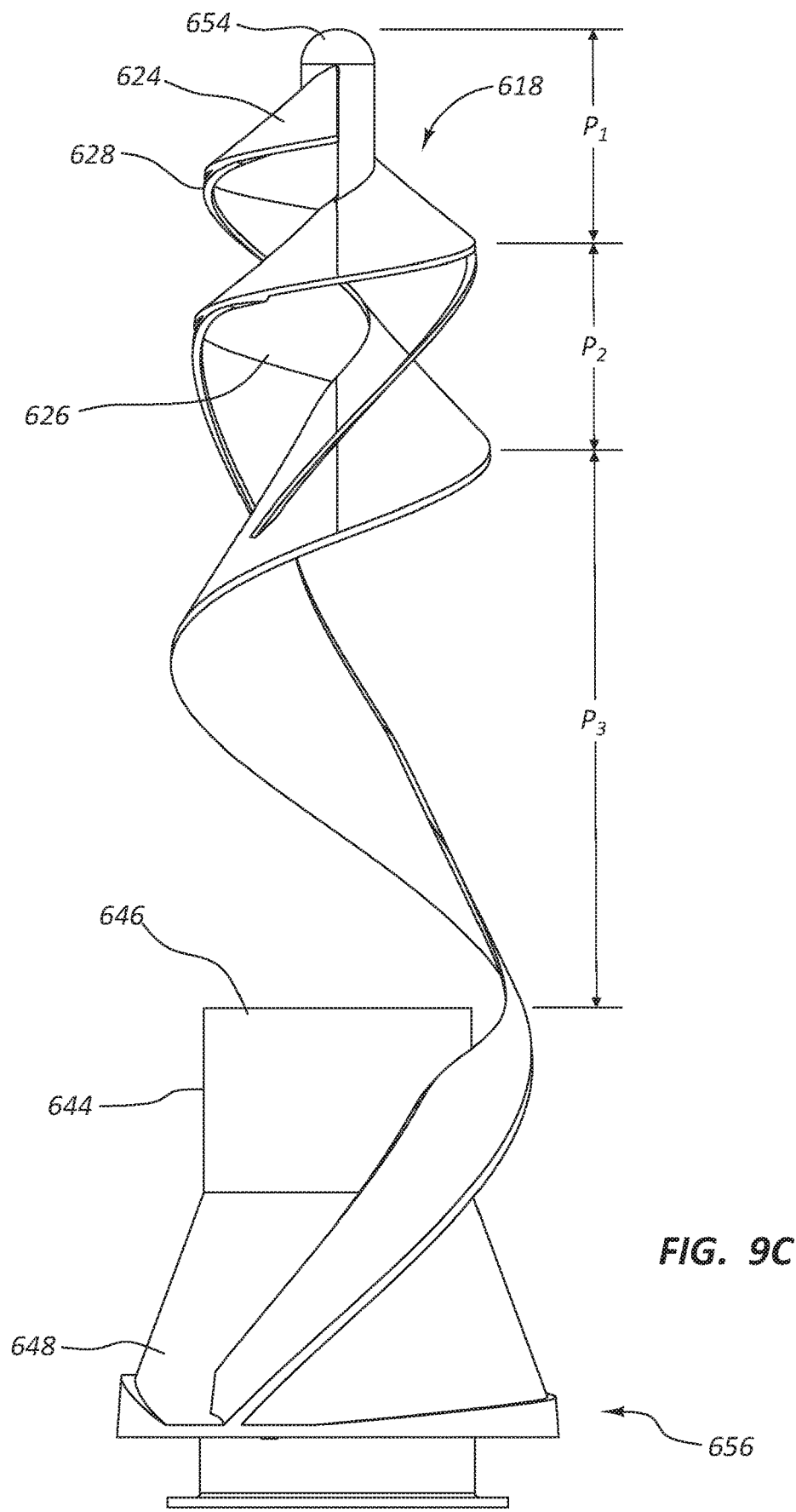

FIG. 9A and FIG. 9B show cutaway views of the low-gravity water separator 600 along lines 9A-9A and 9B-9B as shown in FIGS. 8 and 6, respectively. FIG. 9C is an exemplary view of a helix structure of the low-gravity water capture device of FIG. 6. The low-gravity water separator 600 includes the helix structure 618. The elongated tube 608 may include with an inner wall 610 and an outer wall 612. An opening 614 to the low-gravity water separator 600 may be on a first end 616 of the elongated tube 608. The opening 614 may be positioned to accept the air stream.

A helix structure 618 may be positioned within the elongated tube 608. The helix structure 618 may guide an air stream from the opening 614 at the first end of the elongated tube 608 to a second end 620 of the elongated tube 608. By the time the air reaches the second end 620, at least some of the water droplets may be separated from the air stream and captured in a reservoir 622 proximate the second end 620 of the elongated tube 608. The air stream may continue past the reservoir 622 and release into an air output system (e.g., air output system 106 shown in FIG. 1).

The geometry of the helix structure 618 may cause water droplets to separate from the airflow as the air stream travels through the helix structure 618 toward the second end 620 of the low-gravity water separator 600. In some embodiments, the flow path and velocity of the air may cause water droplets to separate from the air streams. The helix structure 618 may have an upper surface 624 and a lower surface 626 arranged opposite the upper surface 624. The helix structure 618 may additionally include an outer edge 628. The outer edge 628 of the helix structure 618 may continuously contact the inner wall 610 of the elongated tube 608.

The helix structure 618 may have a varying helical pitch as the helix structure 618 traverses from the first end 616 of the elongated tube 608 to the second end 620 of the elongated tube 608. For example, the helix structure 618 may have an initial helical pitch $p_1$, a transitional helical pitch $p_2$, and a final helical pitch $p_3$. The initial helical pitch $p_1$, transitional helical pitch $p_2$, and final helical pitch $p_3$ may be similar to the initial helical pitch $p_1$ as described with reference to FIGS. 5A-5D. As the helical pitch changes, the upper surface 624 of the helix structure 618 may maintain a smooth and continuous surface.

The changing helical pitch may also cause an interior angle between the upper surface 624 of the helix structure 618 and the inner wall 610 of the elongated tube 608. For example, an initial interior angle $\alpha_1$, transitional interior angle $\alpha_2$, and final interior angle $\alpha_3$ may be sized similarly to the initial interior angle $\alpha_1$, transitional interior angle $\alpha_2$, and final interior angle $\alpha_3$ described with reference to FIGS. 5A-5D. The interior angles $\alpha_1$, $\alpha_2$, $\alpha_3$ may aid in water flow from the air inlet 602 of the low-gravity water separator 600 to the reservoir 622.

The reservoir 622 in the low-gravity water separator 600 may be formed between the inner wall 610 of the elongated tube 608 and an exterior wall 644 of an interior cylinder 646 located within the elongated tube 608. The height of the interior cylinder 646 may be high enough to hold the water separated from the air entering the opening 614. A connecting wall 648 may form a bottom 650 of the reservoir 622. The connecting wall 648 may connect a bottom of the elongated tube 608 to approximately a midpoint of the interior cylinder 646. Dry air may pass through an opening 652 formed in the interior cylinder 646. Water collected in the reservoir 622 may be extracted from the reservoir via one or more water discharges 606.

In some embodiments, an inlet cap 654 may be positioned proximate the air inlet 602 (see FIG. 9A). The inlet cap 654 may prevent the formation of a rivulet on an inside edge of the helix structure 618. The inlet cap 654 may set a predetermined distance between the inside edge of the helix structure 618 and a center axis 656 of the low-gravity water separator 600. The inlet cap 654 may prevent the air stream from entering the helix structure 618 at a trajectory directly down the center axis 656.

In some embodiments, air may enter the reservoir 622 at a rapid velocity. The velocity of the air flow entering the reservoir 622 may continue to increase after the air has entered the reservoir 622 and may turn into turbulent air flow. Turbulent air flow in the reservoir may disrupt a water rivulet or pool of water that may be gather in the reservoir 622.

In some embodiments, air flow to the reservoir 622 may be restricted. For example, a baffle (not shown) may sit atop the exterior wall 644 of the interior cylinder 646. The baffle may have a donut-like shape or toroidal shape. For example the baffle may have an interior hole which may allow air to flow out of the low-gravity water separator 600 through interior cylinder 646. An outer diameter of the baffle may be smaller than an inner diameter of the inner wall 610 of the low-gravity water separator 600. For example, there may be gap or predetermined distance between the inner wall 610 and a perimeter edge the baffle. The gap, or space, between the inner wall 610 and the baffle may enable the rivulet and water laden air to enter the reservoir 622 while reducing the velocity and volume of air flow to the reservoir.

In some embodiments, the exterior wall 644 of the interior cylinder 646 may incorporate one or more holes along its surface at locations between its open distal and proximal end. The one or more holes may allow turbulent air to exit the reservoir 622 while water remains in the reservoir. For example, capillary forces may retain the water inside the reservoir while turbulent air may exit the reservoir 622 through the one or more holes.

In another embodiment, one or more fins (not shown) may be incorporated into the reservoir 622. For example, after the helix structure 618 enters the reservoir 622, the helix structure 618 may terminate near the second end 620 of the low-gravity water separator 600. One or more stabilizing fins may wrap around interior cylinder 646 and/or connecting wall 648, 650. The stabilizing fins may transition the turbulent, fast airflow entering and swirling in the reservoir 622 into smooth and slower laminar air flow. Laminar airflow in the reservoir may reduce or lessen interruptions to the water rivulet formed within the reservoir. Fewer disruptions to the rivulet may enable to the water to stay within the reservoir. Furthermore, the fins may provide the same or similar benefits related to stabilizing the water collected in the reservoir 622 as the vanes 248 described above with reference to the low-gravity water separator 200.

FIG. 9C is a side view of the helix structure 618 of the low-gravity water separator 600 of FIG. 6. The helix structure 618 may incorporate similar features of the helix structure 218 discussed previously. For example, in some embodiments, the helix structure 618 may have various features on the upper surface 624 of the helix structure 618. For example, the helix structure 618 may have a groove in the upper surface 624. The groove may use surface tension and capillary forces to guide or direct the water towards the outer edge 628 of the helix structure 618. The groove may help stabilize the water flow as it transitions towards the reservoir 622. In other embodiments, a tertiary vane may protrude from and extend along the upper surface 624 of the helix structure 618 to provide a stabilizing force for a water rivulet and water droplets. Either feature, a groove or a tertiary vane, may direct water droplets to the outer edge 628 of the helix structure 618 towards a rivulet. The groove or tertiary vane may provide stability to water rivulets.

Figure 10:
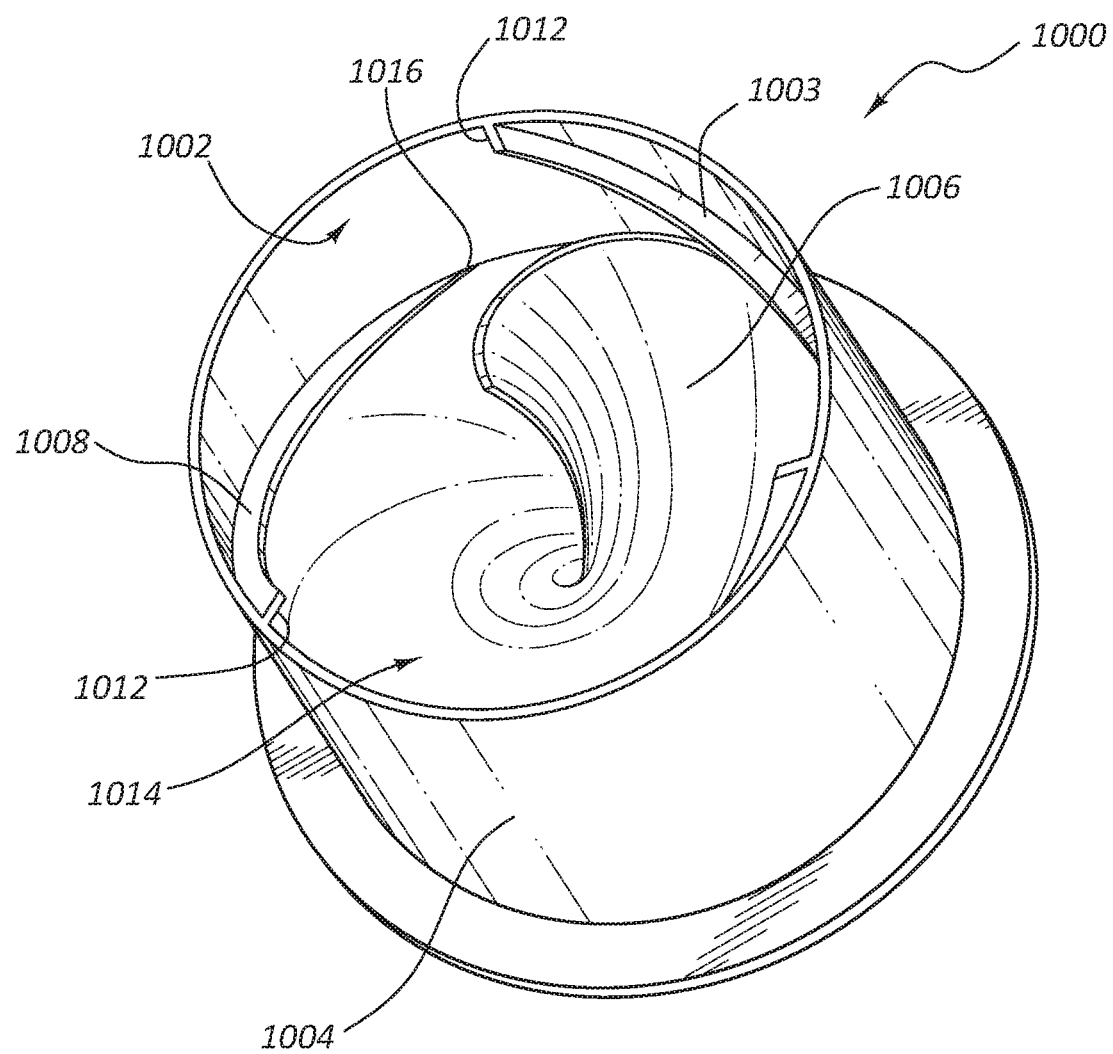

FIG. 10 is a perspective view of a cutaway of an internal portion of a low-gravity water separator 1000. The low-gravity water separator 1000 may include an inner wall 1002, an outer wall 1004 positioned opposite the inner wall 1002, and a helix structure 1006 positioned within the inner wall 1002. The low-gravity water separator 1000 may include one or more secondary vanes 1008. The secondary vanes 1008 may protrude from the inner wall 1002 towards a centerline of the low-gravity water separator 1000. The secondary vanes 1008 may be of sufficient size to guide water droplets which may be stuck on the inner wall 1002. The secondary vanes 1008 may be formed on the inner wall 1002, may be integrally formed as a single piece with the inner wall 1002, or may be formed separately and mounted to the inner wall 1002 in a separate assembly step.

The secondary vane 1008 may begin at a first location 1012 at an initial predetermined distance from an upper surface 1014 of the helix structure 1006. A pitch of the secondary vane 1008 may then be greater than a pitch of the corresponding portion of the helix structure 1006 such that an end location 1016 is proximate the upper surface 1014 of the helix structure 1006. In some embodiments, the end location 1016 may merge into the upper surface 1014 of the helix structure 1006. In another embodiment, the end location 1016 may not touch or come into contact with the upper surface 1014, but rather may be a distance away from the upper surface 1014. The secondary vane 1008 may enable water droplets clinging to the edge of the inner wall 1002 to be guided down into a rivulet flow as will be discussed with reference to FIG. 11.

Figure 11:
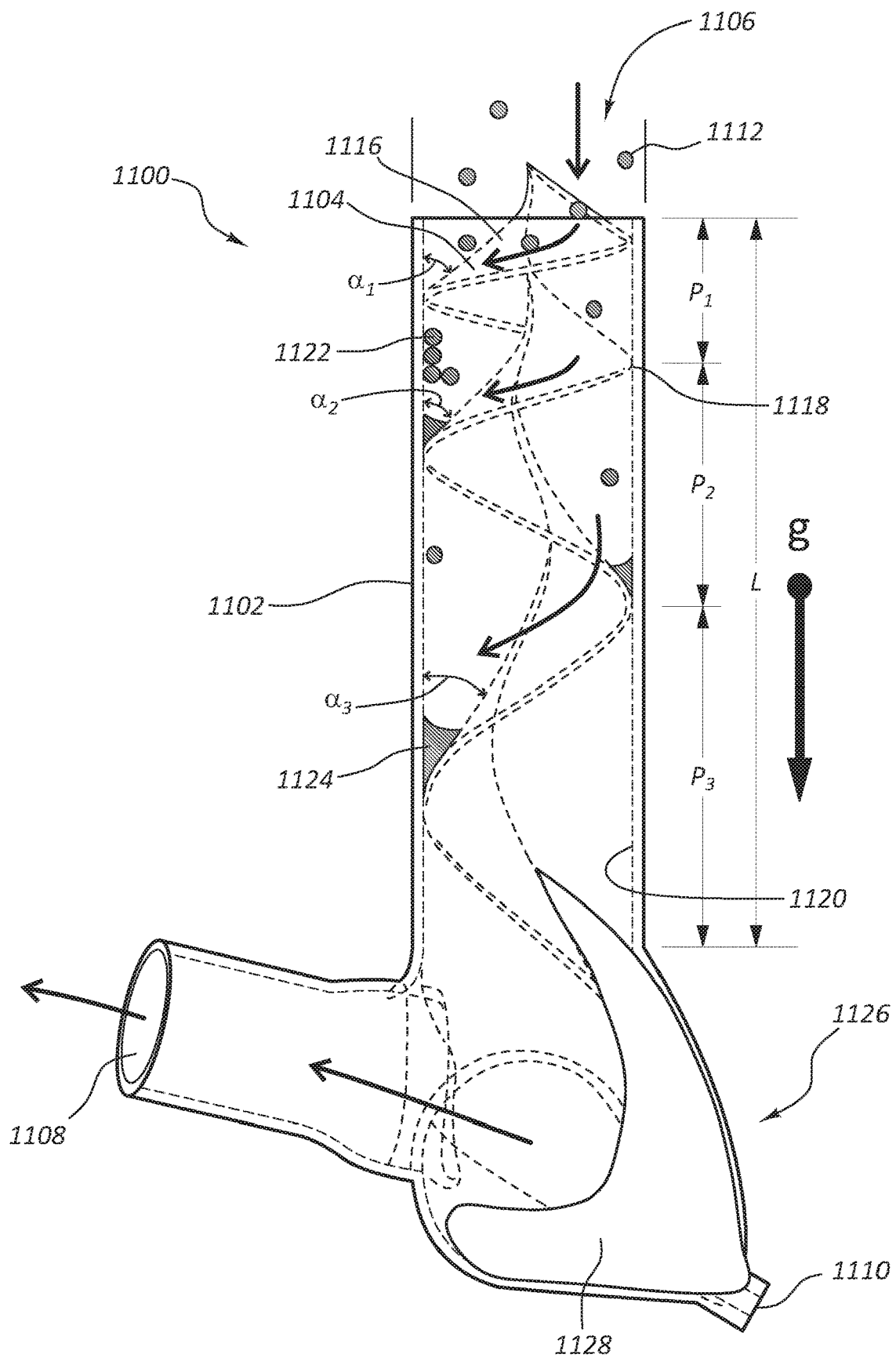

FIG. 11 is an example of a low-gravity water separator 1100. The low-gravity water separator 1100 may be an example of one or more aspects of a low-gravity water separator 102, 200, 600, 1000 described with reference to FIGS. 1-10. The low-gravity water separator 1100 may include an elongated tube 1102 with a helix structure 1104. The low-gravity water separator 1100 may include an air inlet 1106, air outlet 1108, and one or more water discharges 1110.

The helix structure 1104 may have a changing helical pitch along its length L. The helix structure 1104 may have an initial helical pitch $p_1$, a transitional pitch $p_2$, and a final pitch $p_3$, as discussed previously. The helix structure 1104 may additionally include an initial angle $\alpha_1$, a transitional angle $\alpha_2$, and a final angle $\alpha_3$, as discussed previously.

Air 1112 laden with water droplets may enter the low-gravity water separator 1100 through an air inlet 1106. The water laden air 1112 may be forced into an air stream as it enters the low-gravity water separator 1100 through gravity or an external forcing device such as a fan or the like.

The initial angle $\alpha_1$ combined with the initial helical pitch $p_1$ at the air inlet 1106 may create an overall angle of an upper surface 1116 of the helix structure 1104. The initial range of the initial angle $\alpha_1$ may drive wall-bound water laden air 1112 towards an interior corner 1118 where the upper surface 1116 of the helix structure 1104 meets with an inner wall 1120 of the elongated tube 1102. The initial angle $\alpha_1$ may induce a radial velocity of the water laden air 1112. The radial velocity may be within a range of 700 to 2000 RPM. The rapid circumferential flow may create a radial acceleration of the water laden air 1112, or entrained drops. The radial acceleration may be within a range of 30 g and 150 g. The radial acceleration may cause water droplets 1122 to separate from the air 1112.

For example, the helix structure 1104 may cause a centrifugal, or cyclonic, liquid separation of the water droplets from the air stream. The centrifugal liquid separation may exploit the density difference between the liquid and gas in the air flow to concentrate the water droplets 1122 on the inner wall 1120 and upper surface 1116. Air 1112 entering the low-gravity water separator 1100, with entrained water droplets, may rapidly change flow direction from an even axial flow to a rapid cross-axial rotating flow. The axial airflow may be airflow mostly perpendicular to an axis of the helix structure 1104. This axial airflow may change to cross-axial airflow, or airflow that is aligned with the direction of the helix structure 1104. The relatively 'lighter' air 1112 may change direction more easily than the 'heavier' water droplets 1122 forcing the water droplets 1122 to drift toward, and eventually collide with, the inner wall 1120 and upper surface 1116.

As the water droplets 1122 separate from the air 1112, the remaining radial velocity of the air 1112 may drive the water droplets 1122 into the interior corner 1118. The water droplets 1122 may form a rivulet 1124, or a very small stream, of the water droplets 1122. For example, a centripetal force acting on the air 1112 may cause the water droplets 1122 to drive toward the rivulet 1124. Centripetal force may be a force that acts on the air 1112 as it moves in a circular path down the helix structure 1104. The centripetal force acting on the air 1112 may be directed toward a center of the helix structure. The centripetal force acting on the air 1112 may be, for example, approximately $6 \times 10^{-7}$ lbf to $1 \times 10^{-3}$ lbf. As described previously, the speed is dependent on the ratio of air residence time to droplet drift time. The physical parameters that influence this are the size of the droplets, gas viscosity, and the density difference between the liquid and gas. Therefore, the centripetal force may change as the mass and acceleration of the droplets change.

As more water droplets 1122 coalesce with the rivulet 1124, the rivulet 1124 may swell until it fills a gas boundary layer. A gas boundary layer may be a region of air flow near a surface of the inner wall 1120 or upper surface 1116 of the helix structure 1104 over which the gas is flowing, which may move at a lower velocity than the bulk of the freestream air flow. The thickness of the gas, or air, boundary layer may increase as the air flows through the helix structure 1104. The size of the gas boundary layer may determine how large the rivulet 1124 may swell while still maintaining stability of the rivulet. The boundary layer may be defined as the layer of air that is moving at less than 99% of the velocity of the main bulk air stream. In the low-gravity water separator 1100, the boundary layer may be approximately 0.5 inches. In some embodiments, the boundary layer may vary along the length of the helix structure 1104. The boundary layer may be thinner at the leading edge of the helix structure 1104 near the air inlet 1106. The boundary layer may increase until it exits the low-gravity water separator 1100. This natural viscous nature may provide a low velocity zone proximate the inner wall 1120 and may prevent the rivulet 1124 from being destabilized even when the bulk of the air is moving rapidly.

For example, the rivulet 1124 may continue to swell and the rivulet 1124 may press into a gas velocity stream and the air stream may force the coalesced water droplets 1122 in the rivulet 1124 down the interface between helix structure 1104 and inner wall 1120. This may cause a cross-section of the rivulet 1124 to shrink as the rivulet 1124 is elongated by the air stream. As more water droplets 1122 coalesce within the rivulet 1124, the rivulet 1124 may once again swell and repeat the process. The process may repeat as water droplets coalesce within the rivulet 1124 which may cause the rivulet 1124 to migrate toward the reservoir 1126.

Some water droplets 1122 may be driven efficiently to the rivulet 1124. Other water droplets 1122 may glide or move along the inner wall 1120 of the elongated tube 1102 or the upper surface 1116 of the helix structure 1104. In some embodiments, the water droplets 1122 may work their way into the rivulet 1124. In other embodiments, secondary vanes (e.g., secondary vanes 1008, FIG. 10) may also guide the water droplets 1122 to the rivulet 1124. In additional and/or alternative embodiments, helical vanes (not shown) may also guide water droplets 1122 to the rivulet 1124. Helical vanes may be similar to the secondary vanes but rather than being located on the inner wall 1120 of the elongated tube 1102, may be located on the upper surface 1116 of the helix structure 1104.

The rivulet 1124 may be a stable two-phase flow regime. For example, the rivulet 1224 may form a long connected 'string' of water along the interior corner of the intersection between the upper surface 1116 and the inner wall 1120 and may remain in that interior corner 1118. The flow of the air 1112 may help stabilize the rivulet 1124, but if the air flow exceeds, for example, about 36 feet per second, the speed of the air 1112 may disrupt the rivulet 1124. For example, the rivulet 1124 may experience stable two-phase flow when velocity of the air is not fast enough to pull water out of the rivulet 1124.

The decreasing interior angles $\alpha_1$, $\alpha_2$, $\alpha_3$ may also stabilize the rivulet 1124. The decreasing interior angles $\alpha_1$, $\alpha_2$, $\alpha_3$ may induce capillary forces in the water droplets 1122. The capillary forces may maintain stability of the rivulet 1124. The decreasing interior angles $\alpha_1$, $\alpha_2$, $\alpha_3$ also may provide a decreasing potential in the direction of a reservoir 1126 where the water droplets 1122 form a collective pool of water 1128.

The decreasing interior angles $\alpha_1$, $\alpha_2$, $\alpha_3$ may correlate to an increasing pitch of the helix structure 1104. As the rivulet 1124 is formed, the flow of the air 1112 may be slowed as the transitional pitch $p_2$ increases. The initial helical pitch $p_1$ may initiate a high air flow 1112 and the transitional pitch $p_2$ may slow down the air flow to, for example, about 18 feet per second for the size, shape, and range of flow rates typical for the embodiment shown in FIG. 7. The slower air speed in the transitional pitch $p_2$ may stabilize the rivulet 1124. The slower air speed may be less rapid axial flow. The less rapid axial air flow may drive the water droplets 1122 down the rivulet 1124 and into the reservoir 1126. The less rapid axial flow of the air 11F12 may also allow droplet free air to escape the low-gravity water separator 1100. A gradual transition between the final pitch $p_3$ and the air outlet 1108 may maintain the air flow and may enable the droplet free air to be emitted.

Figure 12:
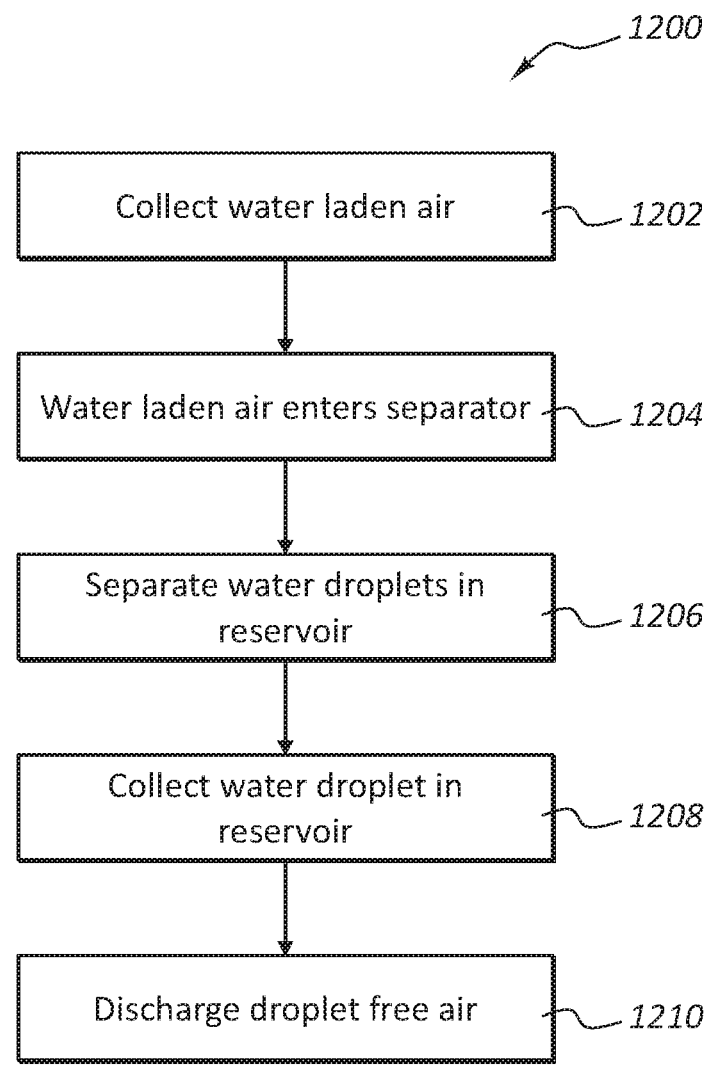

FIG. 12 is a flow chart illustrating an example of a method relating to air and water separation, in accordance with various aspects of this disclosure. The method may include collecting droplet laden air 1202. The droplet laden air may enter a water separator 1204. The water separator may be a low-gravity water separator. Water droplets may be separated from air stream 1206. For example, a variable helix structure within the low-gravity water separator may use air flow and inertial forces to separate water droplets and air stream. The water droplets may be collected in a reservoir for harvesting 1208. The droplet free air may be emitted back into the environment or other system 1210.

Figure 13:
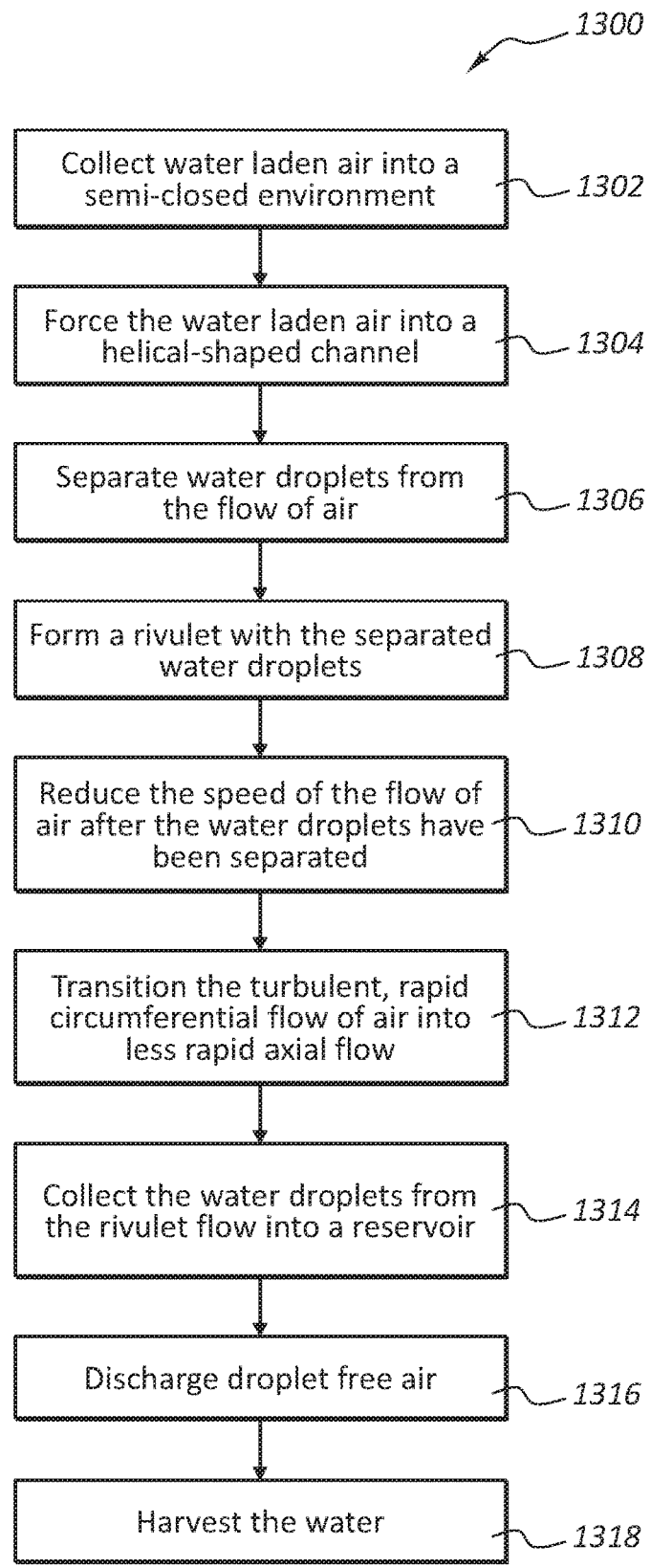

FIG. 13 is another flow chart illustrating an example of a method 1300 relating to air and water separation, in accordance with various aspects of this disclosure. The method 1300 may be performed using any one of the low-gravity water separators 102, 200, 600, 1000, 1100 discussed herein.

The method 1300 may collect water laden air into a semi-closed environment 1302. The water laden air may be forced into the semi-closed environment using a forcing function such as fan and/or gravity. The semi-closed environment may consist of a low-gravity water separator.

The method 1300 may force the water laden air into a helical-shaped channel 1304. The forcing function may cause a turbulent, rapid circumferential flow of the air. The helical-shaped channel may include a variable pitch along its length. The variable pitch of the helical shaped-channel may separate water droplets from the air stream 1306. For example, the air stream may contact one or more surfaces of the helical-shaped channel.

A rivulet may be formed with the separated water droplets 1308. The water droplets may be stabilized in the rivulet using the air stream. In some embodiments, one or more secondary vanes may guide separated water droplets towards the rivulet. The speed of the air stream may be reduced after the water droplets have been separated 1310. For example, the variable pitch of the helical-shaped channel may cause the air speed to decrease. This may cause the turbulent, rapid circumferential air stream transition into less rapid axial flow 1312. As the air flow slows, the flow may change from a cross-axial flow perpendicular to the axis of the low-gravity water separator 1100 into a streamwise flow parallel to the axis of the low-gravity water separator 1100. The water droplet from the rivulet flow may then be collected into a reservoir 1314. This may include guiding the streamwise driven rivulet flow into the water reservoir. The method 1300 may then discharge droplet free air 1316 and may harvest the water 1318 as necessary.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A method of separating water droplets from a stream of water laden air, the method comprising:
    forcing the stream of water laden air into a helical-shaped channel to create a turbulent, rapid circumferential air flow, the helical-shaped channel having a variable pitch along its length;
    separating water droplets from the air flow;
    forming a rivulet with the separated water droplets;
    reducing a speed of the air flow after the water droplets have been separated;
    transitioning the turbulent, rapid circumferential air flow into a less rapid, axial flow;
    collecting the water droplets from the rivulet into a reservoir.

2. The method of claim 1, wherein separating water droplets from the air flow includes contacting the air flow against one or more surfaces of the helical-shaped channel, and forming the rivulet includes collecting the separated water droplets from the one or more surfaces of the helical-shaped channel.

3. The method of claim 1, further comprising:
    stabilizing the water droplets within the rivulet using the air flow.

4. The method of claim 1, further comprising:
    guiding separated water droplets towards the rivulet with one or more secondary vanes.

5. The method of claim 1, wherein forming the rivulet further includes forming a cross-axial air flow perpendicular to a central axis of the helical-shaped channel.

6. The method of claim 5, further comprising:
    converting the cross-axial air flow perpendicular to the direction of flow for the rivulet into a streamwise air flow parallel to the direction of flow for the rivulet.

7. The method of claim 6, wherein collecting the water droplets from the rivulet into a reservoir comprises:
    guiding the rivulet into the reservoir.

8. An apparatus to separate water droplets from an air stream, the apparatus comprising:
    an elongated tube having a first end and a second end;
    an opening at a first end of the elongated tube, the opening positioned to accept the air stream;
    a reservoir positioned at a second end of the elongated tube;
    a helix structure positioned within the elongated tube, the helix structure comprising:
        an upper surface;
        a lower surface arranged opposite the upper surface;
        an outer edge;
        a variable pitch along a length of the elongated tube, the variable pitch providing a variable interior angle between an inner wall of the elongated tube and the upper surface of the helix structure.

9. The apparatus of claim 8, wherein the helix structure comprises:
    an initial helical pitch at the first end of the elongated tube, the initial helical pitch initiating turbulence in the air stream entering the opening;
    a transitional pitch that initiates water droplets in the air stream to separate from the air stream;
    a final pitch that slows the air stream from which the water droplets have been separated.

10. The apparatus of claim 8, further comprising:
    an initial interior angle between the inner wall of the elongated tube and the upper surface of the helix structure at a first location forcing water droplets into a single rivulet using capillary forces;
    a transitional interior angle between the inner wall of the elongated tube and the upper surface of the helix structure at a second location providing a decreasing potential in the water droplets in a direction of the reservoir;
    a final interior angle between the inner wall of the elongated tube and the upper surface of the helix structure at a third location to transition from the single rivulet into the reservoir.

11. The apparatus of claim 8, further comprising:
    an air exit positioned at the second end of the elongated tube, the air exit formed as a hollow cylinder;
    a vane bisecting the reservoir, the vane positioned to retain water droplets in the reservoir while allowing the air stream to exit the apparatus through the air exit.

12. The apparatus of claim 8, further comprising:
    a drain access to the reservoir.

13. The apparatus of claim 8, wherein the upper surface of the helix structure is smooth and continuous.

14. The apparatus of claim 8, further comprising:
    one or more secondary vanes positioned on the inner wall of the elongated tube, the one or more secondary vanes mimicking a pitch angle of the helix structure.

15. The apparatus of claim 8, further comprising
    one or more vanes positioned on the upper surface of the helix structure, the one or more vanes beginning near a center point of the helix structure and extending towards the outer edge of the helix structure.

16. The apparatus of claim 8, wherein the helix structure further comprises a length over diameter ratio of less than four.

17. The apparatus of claim 8, wherein a pitch length is continuously increasing along the length of the helix structure.

18. The apparatus of claim 8, wherein the interior angle between an inner wall of the elongated tube and the upper surface of the helix structure is continuously decreasing along the length of the helix structure.

19. An apparatus to separate water droplets from an air stream, the apparatus comprising:
- an elongated housing having a first end and a second end;
- an inlet opening at a first end of the housing, the inlet opening positioned to accept the air stream;
- a reservoir positioned at a second end of the housing;
- a helix structure positioned within the housing, the helix structure comprising:
  - an upper surface;
  - a variable pitch along a length of the housing, the variable pitch providing a variable interior angle between an inner wall of the housing and the upper surface of the helix structure;
  - an initial helical pitch at the first end of the housing, the initial helical pitch initiating turbulence in the air stream entering the inlet opening;
  - a transitional pitch that initiates water droplets in the air stream to separate from the air stream.

20. The apparatus of claim 19, wherein the helix structure further comprises:
- a final pitch that slows the air stream from which the water droplets have been separated.

\* \* \* \* \*